United States Patent
Ohta

(10) Patent No.: US 9,250,359 B2
(45) Date of Patent: Feb. 2, 2016

(54) HARD COAT FILM, POLARIZING PLATE, METHOD FOR PRODUCING HARD COAT FILM, AND METHOD FOR PRODUCING LIQUID CRYSTAL PANEL

(75) Inventor: Tomohisa Ohta, Hino (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 661 days.

(21) Appl. No.: 13/259,104

(22) PCT Filed: Feb. 12, 2010

(86) PCT No.: PCT/JP2010/052051
§ 371 (c)(1), (2), (4) Date: Sep. 22, 2011

(87) PCT Pub. No.: WO2010/113547
PCT Pub. Date: Oct. 7, 2010

(65) Prior Publication Data
US 2012/0015169 A1     Jan. 19, 2012

(30) Foreign Application Priority Data
Mar. 31, 2009  (JP) ................................. 2009-086501

(51) Int. Cl.
*B32B 38/10* (2006.01)
*B32B 7/02* (2006.01)
(Continued)

(52) U.S. Cl.
CPC .......... *G02B 1/105* (2013.01); *B29D 11/00865* (2013.01); *G02B 1/04* (2013.01); *G02B 5/3025* (2013.01); *G02F 2201/50* (2013.01);
(Continued)

(58) Field of Classification Search
CPC ...... B05D 3/04; B29D 11/00865; B32B 7/02; B32B 23/20; G02B 1/04; G02B 1/105
USPC .......................... 156/250, 252, 253, 256, 263
See application file for complete search history.

(56) References Cited

U.S. PATENT DOCUMENTS

| 2004/0160566 A1* | 8/2004 | Kawabe et al. ................ 349/153 |
| 2005/0016670 A1* | 1/2005 | Kanbara et al. ................ 156/257 |
| 2006/0069192 A1 | 3/2006 | Nakamura et al. |

FOREIGN PATENT DOCUMENTS

| JP | 9-325335 A | 12/1997 |
| JP | 2002-365615 A | 12/2002 |

(Continued)

OTHER PUBLICATIONS

Japanese Machine Translation JP 2008-230036. Oct. 2, 2008.*
(Continued)

*Primary Examiner* — Mark A Osele
*Assistant Examiner* — Christopher C Caillouet
(74) *Attorney, Agent, or Firm* — Holtz, Holtz & Volek PC

(57) ABSTRACT

The object of the present invention is to prevent or suppress occurrences of uneven saponification and blocking, while improving cutting properties and dimensional stability. Specifically disclosed is a hard coat film (130) which comprises a protective film (114) for protecting a polarizer (112), and a hard coat layer (118) that is formed on the protective film (114). The sum of the thickness of the protective film (114) and the thickness of the hard coat layer (118) is less than 40 μm, and the mixed region of the protective film (114) and the hard coat layer (118) is 1-20% of the thickness of the hard coat layer (118).

8 Claims, 4 Drawing Sheets

(51) Int. Cl.
*B05D 3/04* (2006.01)
*G02B 1/10* (2015.01)
*B29D 11/00* (2006.01)
*G02B 1/04* (2006.01)
*G02B 5/30* (2006.01)

(52) U.S. Cl.
CPC ...... *Y10T156/1074* (2015.01); *Y10T 428/2495* (2015.01); *Y10T 428/24975* (2015.01)

(56) References Cited

FOREIGN PATENT DOCUMENTS

| | | |
|---|---|---|
| JP | 2004-029660 A | 1/2004 |
| JP | 2005-104148 A | 4/2005 |
| JP | 2006-123513 A | 5/2006 |
| JP | 2006-297914 A | 11/2006 |
| JP | 2007-304559 A | 11/2007 |
| JP | 2008-145692 A | 6/2008 |
| JP | 2008-191544 A | 8/2008 |
| JP | 2008-230036 A | 10/2008 |
| JP | 2010-039418 A | 2/2010 |

OTHER PUBLICATIONS

Japanese Machine Translation JP 2006-297914. Mar. 20, 2006.*
Machine Translation of JP 2008145692. JP 2008145692 was submitted in Sep. 22, 2011.*
Machine Translation of JP 2004029660. JP 2004029660 was submitted in Sep. 22, 2011.*
Japanese Office Action dated Jun. 28, 2013 (and English translation thereof) in counterpart Japanese Application No. 2011-507054.

* cited by examiner

HARD COAT FILM, POLARIZING PLATE, METHOD FOR PRODUCING HARD COAT FILM, AND METHOD FOR PRODUCING LIQUID CRYSTAL PANEL

This application is the United States national phase application of International Application PCT/JP2010/052051 filed Feb. 12, 2010.

TECHNICAL FIELD

The present invention relates to a hard coat film, a polarizing plate, a method for producing a hard coat film, and a method for producing a liquid crystal panel.

BACKGROUND

Over recent years, mobile phones and mobile PCs are mounted with a liquid crystal panel serving as a display device. The liquid crystal panel is provided with a polarizing plate. The constitution of a common polarizing plate is partially described briefly below. As shown in FIG. 7, a polarizing plate is provided with a polarizer and a protective film to protect it, and further on the protective film, a hard coat layer is formed. A hard coat layer is formed by coating a certain coating liquid on a protective film (followed by drying). Then, the protective film is bonded to a polarizer via saponification (alkali treatment using 2N NaOH).

In a polarizing plate provided with such a constitution, commonly, the thickness of a protective film is about 40-80 μm and the thickness of a hard coat layer is about 10-30 μm. In cases in which a protective film and a hard coat layer have such thicknesses, when a polarizing plate is bonded to a liquid crystal cell to form a liquid crystal panel and then the liquid crystal panel is cut as a whole, at the interface of the protective film and the hard coat layer, cracking may occur (refer to Patent Document 1). To prevent this possibility, when both a protective film and a hard coat layer are simply allowed to be thinner, there is produced such a disadvantage that when a polarizing plate is held in the roll state, wrinkles tend to occur (refer to Patent Document 2).

PRIOR ART DOCUMENTS

Patent Documents

Patent Document 1: Unexamined Japanese Patent Application Publication No. 2008-191544
Patent Document 2: Unexamined Japanese Patent Application Publication No. 2005-104148

BRIEF DESCRIPTION OF THE INVENTION

Problems to be Solved by the Invention

In a conventional protective film, it has been preferable that after film formation (after protective film production), the protective film is dried or wound in the dry state. However, when the thickness of a protective film is decreased (to at most 30 μm), due to drying, the moisture content of the protective film itself becomes excessively small and then the permeability of a coating liquid, to form a hard coat layer, into the protective film is enhanced (refer to the arrows in FIG. 7). In this case, the mixed region of the protective film and the hard coat layer is increased and in polarizing plate production, when the protective film is bonded to a polarizer, saponification nonuniformity (streak-like appearance defect) occurs.

Such a streak-like appearance defect means that stripe-like streaks appear in parallel in the reflection state in the absorption axis direction of a polarizing plate. Such streaks characteristically show a groove-like shape carved in a phonographic disc at a pitch of 1-2 mm.

When saponification nonuniformity occurs, not only the uniformity of optical characteristics is impaired but also poor close contact between a protective film and a polarizer is made, whereby it becomes difficult that a polarizing plate is bonded to a liquid crystal cell and then cutting is carried out in the unit of a panel.

In contrast, it is thought that a protective film itself is humidified to increase its moisture content and thereby saponification nonuniformity occurrence is prevented or inhibited. However, when the moisture content exceeds a certain value (range) and then excessively increases, after winding the protective film, blocking (a phenomenon in which self-adhesion occurs within a protective film) occurs and poor close contact between the protective film and the hard coated film occurs.

Further, in cases in which a protective film is produced by a solution casting method, a solvent having been used during production remains in the protective film and then due to the influence of the residual solvent, the dimensional stability of a polarizing plate is impaired and thereby light leakage (contrast decrease) may occur in the edge of a liquid crystal panel.

Therefore, a main object of the present invention is to provide a hard coat film in which saponification nonuniformity and blocking occurrence can be prevented or inhibited and excellent cutting performance and dimensional stability are expressed, a polarizing plate, a method for producing a hard coat film, and a method for producing a liquid crystal panel.

Means to Solve the Problems

According to one embodiment of the present invention, in a hard coat film in which a protective film to protect a polarizer and a hard coat layer formed on the protective film are provided, there is provided a hard coat film in which the sum of the thickness of the protective film and the thickness of the hard coat layer is less than 40 μm and the thickness of the mixed region of the protective film and the hard coat layer is 1-20% of that of the hard coat layer.

According to another embodiment, in a polarizing plate in which a polarizer, a first protective film formed on one face of the polarizer, a hard coat layer formed on the first protective film, and a second protective film formed on the other face of the polarizer are provided, there is provided a polarizing plate in which the sum of the thickness of the first protective film and the thickness of the hard coat layer is less than 40 μm and the thickness of the mixed region of the first protective film and the hard coat layer is 1-20% of that of the hard coat layer.

According to another embodiment, in a method for producing a hard coat film in which a hard coat layer is formed on a protective film to protect a polarizer, there is provided a method for producing a hard coat film in which a step to produce the protective film using a melt casting method, a step to humidify the protective film, and a step to form the hard coat layer by coating a certain coating liquid on the protective film are provided, and in the step to humidify the protective film, the moisture content of the protective film is allowed to be 1.5-4%.

According to another embodiment of the present invention, in a method for producing a hard coat film in which a hard coat layer is formed on a protective film to protect a polarizer, there is provided a step to produce the protective film using a solution casting method, a step to heat the protective film, a step to humidify the protective film, and a step to form the hard coat layer by coating a certain coating liquid on the protective film are provided, and in the step to heat the protective film, the residual amount of a solvent remaining in the protective film is allowed to be at most 0.01% and in the step to humidify the protective film, the moisture content of the protective film is allowed to be 1.5-4%.

According to another embodiment of the present invention, there is provided a method for producing a liquid crystal panel in which a step to produce a polarizing plate by bonding a hard coat film produced by the method for producing a hard coat film and a protective film each to a polarizer, a step to separately cut the polarizing plate and a liquid crystal cell to the size of a panel, and a step to bond the cut polarizing plate to the cut liquid crystal cell are provided.

According to another embodiment of the present invention, there is provided a method for producing a liquid crystal panel in which a step to produce a polarizing plate by bonding a hard coat film produced by the method for producing a hard coat film and a protective film each to a polarizer, a step to bond the polarizing plate to a liquid crystal cell, and a step to simultaneously cut the polarizing plate and the liquid crystal cell to the size of a panel are provided.

Effects of the Invention

The present invention can prevent or inhibit saponification nonuniformity and blocking occurrence and also enhance cutting performance and dimensional stability.

PREFERRED EMBODIMENTS OF THE INVENTION

The preferred embodiments of the present invention will now be described with reference to the drawings.

Figure 1:
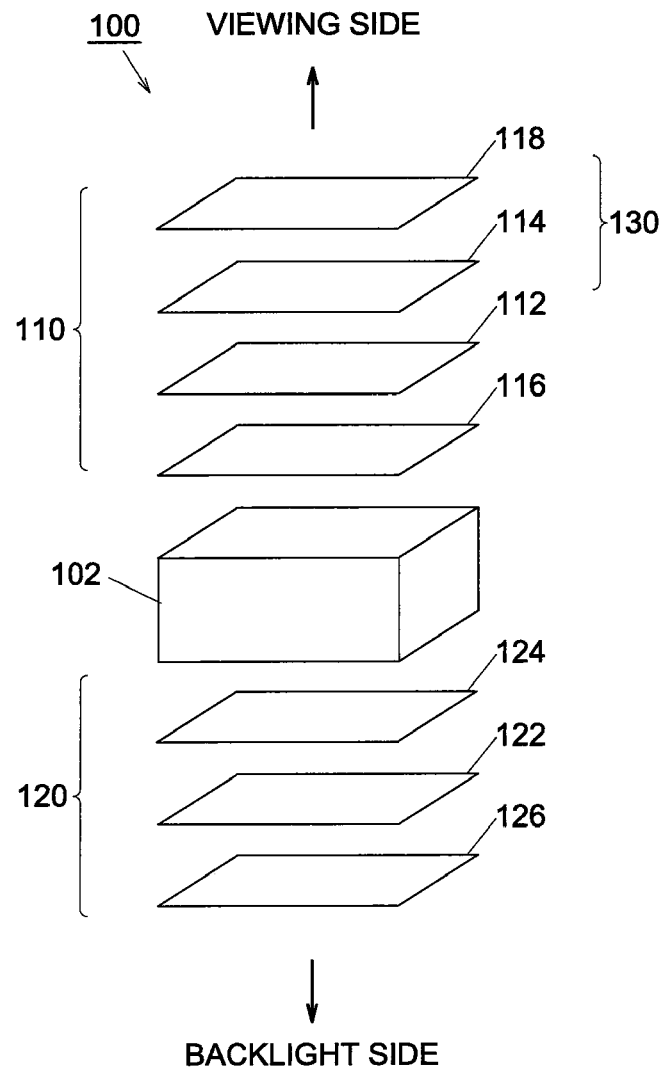
FIG. 1 is an exploded perspective view showing a schematic constitution of a liquid crystal panel according to the preferred embodiments of the present invention.

As shown in FIG. 1, a liquid crystal panel 100 has a liquid crystal cell 102 and 2 polarizing plates 110 and 120, and the liquid crystal cell 102 is sandwiched by the polarizing plates 110 and 120.

The liquid crystal cell 102 mainly incorporates 2 glass substrates and a liquid crystal (molecule), being formed in such a manner that 2 glass substrates are bonded together and then between the glass substrates, a liquid crystal molecule is injected to be sealed.

The polarizing plate 110 incorporates a polarizer 112 (a polarizing membrane or a polarizing film) and 2 protective films 114 and 116 to protect it, having a constitution in which the polarizer 112 is sandwiched by the protective films 114 and 116.

[Polarizer]

The polarizer 112 is a polyvinyl alcohol-based polarizer.

Such a polyvinyl alcohol-based polarizer includes those prepared by dyeing a polyvinyl alcohol-based film with iodine and those dyed with a dichroic dye.

As the polarizer 112, those prepared as described below are used: namely, a polyvinyl alcohol aqueous solution is subjected to film formation, and then the resulting film is uniaxially stretched and then dyed or is dyed and then uniaxially stretched; and thereafter, durability treatment is preferably carried out using a boron compound.

[Protective Film]

The protective films 114 and 116 are films mainly incorporating a cellulose ester. The protective film 114 is bonded to the viewing side of the polarizer 112 and the protective film 116 is bonded to the backlight side thereof.

Protective films 114 and 116 are bonded to a polarizer 112 produced in such a manner that a cellulose ester film is alkali-saponified and the thus-treated film is immersed and stretched in an iodine solution, using a completely saponified polyvinyl alcohol aqueous solution (a water-based adhesive containing a completely saponified polyvinyl alcohol as a main component).

The thicknesses of the protective films 114 and 116 are at most 30 μm.

The protective films 114 and 116 mainly incorporate a cellulose ester resin.

As constituent materials of the protective films 114 and 116, additives (such as plasticizers) may be added.

A cellulose ester resin and additives are described below and also usable materials are exemplified.

[Cellulose Ester Resin]

As one example of a cellulose ester, cellulose acylate is usable.

Cellulose serving as a cellulose acylate raw material is not specifically limited, including cotton linter, wood pulp, and kenaf. Further, raw material celluloses obtained therefrom may be used by mixing at any appropriate ratio.

Cellulose acylate is preferably cellulose acylate having an acetyl group or an acyl group having a carbon atom number of 3-22. Examples of such an acyl group having a carbon atom number of 3-22 include a propionyl ($C_2H_5CO-$), a n-butyryl group ($C_3H_7CO-$), an iso-butyryl, a valeryl ($C_4H_9CO-$), an iso-valeryl, a sec-valeryl, a tert-valeryl, an octanoyl, a dodecanoyl, an octadecanoyl, and an oleoyl group. A propionyl and a butyryl group are preferable.

As cellulose acylate according to the present embodiments, one satisfying all the conditions of expression (1)-expression (3) is favorably used, provided that the substitution degree of an acetyl group is designated as X and the sum of the substitution degree of a propionyl group and the substitution degree of a butyryl group is designated as Y. The conditions of expression (4)-expression (6) are preferably satisfied.

$$2.0 \leq X+Y \leq 3.0 \tag{1}$$

$$0.1 \leq X \leq 2.9 \tag{2}$$

$$0.1 \leq Y \leq 2.9 \tag{3}$$

$$2.5 \leq X+Y \leq 3.0 \tag{4}$$

$$0.1 \leq X \leq 1.5 \tag{5}$$

$$1.5 \leq Y \leq 2.9 \tag{6}$$

The polymerization degree (viscosity average) of cellulose acylate is preferably 200-700, specifically preferably 250-550. These cellulose acylates are commercially available from Dicel Chemical Industries, Ltd., Courtaulds PCL, Hoechst AG, and Eastman Kodak Co. Photographic grade cellulose acylate is preferably used.

The moisture content of cellulose acylate is preferably at most 2% by mass.

A glucose unit having β-1,4 bonding constituting cellulose has free hydroxyl groups at 2-position, 3-position, and 4-position. Cellulose acylate is a polymer in which part of or all of these hydroxyl groups are esterified with acetic acid or another acid. Acyl substitution degree refers to the rate of esterification of cellulose with respect to 2-position, 3-position, and 6-position each (100% esterification is designated as 1.00).

Cellulose acylate used in the present invention is obtained in such a manner that cellulose acylate in which the sum of the acyl substitution degrees of 2-position and 3-position is 1.70-1.95 and the acyl substitution degree of 6-position is at least 0.88; and cellulose acylate in which the sum of the acyl substitution degrees of 2-position and 3-position is 1.70-1.95 and the acyl substitution degree of 6-position is less than 0.88 are blended. When the sum of the acyl substitution degrees of 2-position and 3-position is at most 1.70, film tends to become hygroscopic and be easily hydrolyzed, whereby the durability of the film is decreased. Further, dimensional variation due to humidity increases. In contrast, in the case of more than 1.95, the organic nature of the cellulose acylate increases, and thereby the affinity with solvents increases and the viscosity of a dope for solution casting increases. Therefore, the sum of the acyl substitution degrees of position and 3-position is preferably 1.70-1.95, more preferably 1.75-1.88.

Incidentally, the hydroxyl group at 6-position is a primary hydroxyl group differing from the hydroxyl groups of 2-position and 3-position and thereby it has become made clear that hydrogen bonding of the hydroxyl group is extremely likely to occur. Therefore, when the acyl substitution degree of 6-position is allowed to be at least 0.88, solubility to a solvent is remarkably enhanced and then a dope preferable in solution casting suitability can be obtained. The range of the acyl substitution degree of 6-position is preferably 0.88-0.99 in view of synthetic suitability, more preferably 0.89-0.98. However, when the acyl substitution degree of 6-position is increased, a problem such that film strength is decreased is produced, and the compatibility thereof has been difficult. Further, the acyl substitution degree is less than 0.88, solubility to solvents is markedly decreased, which is unfavorable.

Further, in an optical film in which a thin film is formed on a film incorporating cellulose acylate in which the sum of the acyl substitution degrees of 2-position and 3-position is 1.70-1.95 and the acyl substitution degree of 6-position is at least 0.88; or a film in which the sum of the acyl substitution degrees of 2-position and 3-position is 1.70-1.95 and the acyl substitution degree of 6-position is less than 0.88, during storage in the roll state, flatness degradation such as wrinkles and concaves tends to occur. Further, there have been noted problems in which a formed metal oxide layer tends to crack and film thickness nonuniformity tends to occur.

It has been made clear that these problems can be solved by blending cellulose acylates. Further, in cellulose acylate in which the acyl substitution degree of 6-position is at least 0.88, from the viewpoint of film strength, the carbon number of acyl substituents is preferably small and further all substituents are preferably an acetyl group.

Incidentally, Unexamined Japanese Patent Application Publication No. 11-5851 describes cellulose acetate in which the sum of the acetyl substituents of 2-position, 3-position, and 6-position is at least 2.67 and the sum of the acetyl substituents of 2-position and 3-position is at least 1.97. Of these, the range in which the sum of 2-position and 3-position is more than 1.90 is described as a preferable range from the viewpoint of the optical suitability of a film, but from the viewpoint of casting suitability, the range described in the present specification is more preferable.

The fundamental principle of the synthetic method of cellulose acylate is described in Migita at al., Mokuzai Kagaku (Wood Chemistry), pp. 180-190 (Kyoritsu Shuppan Co., Ltd., 1968). A typical synthetic method is a liquid-phase acetification method using an acetic anhydride-acetic acid-sulfuric acid catalyst system. Specifically, a cellulose raw material such as wood pulp is pretreated with an appropriate amount of an organic acid, followed by being poured into a pre-cooled acylating mixed liquid for esterification to synthesize a complete cellulose acylate (the sum of the acyl substitution degrees of 2-position, 3-position, and 6-position is about 3.00). The above acylating mixed liquid generally contains an organic acid as a solvent, an organic acid anhydride as an esterification agent, and sulfuric acid as a catalyst. The organic acid anhydride is commonly used at stoichiometrically excessive amount, compared with the sum of water present in cellulose to react therewith and the system. After termination of acylation, to hydrolyze the excessive organic acid anhydride remaining in the system and to neutralize part of the esterification catalyst, an aqueous solution of a neutralizer (for example, a carbonate, acetate, or oxide of calcium, magnesium, ion, aluminum, or zinc) is added. Subsequently, the thus-obtained complete cellulose acylate is maintained at 50-90° C. in the presence of a small amount of an acetification catalyst (commonly, the remaining sulfuric acid), and thereby saponification ripening is carried out to make a change to cellulose acylate having desired acyl substitution degree and polymerization degree. At the moment such a desired cellulose acylate has been obtained, the residual catalyst in the system is completely neutralized with a neutralizer as described above or no neutralization is carried out. Then, the cellulose acylate solution is poured into water or dilute sulfuric acid (alternatively, water or dilute sulfuric acid is poured into the cellulose acylate solution) for separation of the cellulose acylate, followed by washing and stabilization treatment to obtain the cellulose acylate.

In a common cellulose acylate synthetic method, the acyl substitution degree of 2-position or 3-position is larger than that of 6-position. Therefore, to allow the sum of the acyl substitution degrees of 2-position and 3-position to be at most 1.95 and also to allow the acyl substitution degree of 6-position to be at least 0.88, the above reaction conditions need to be specially adjusted. With respect to specific reaction conditions, it is preferable that the amount of a sulfuric acid catalyst is decreased and the duration of acylation is extended. When the amount of such a sulfuric acid catalyst increases, acylation rapidly progresses. However, depending on the amount of the catalyst, a sulfuric acid ester is produced with cellulose and then via liberation thereof at termination of the reaction, remaining hydroxyl groups are generated. Such a sulfuric acid ester is produced more at 6-position which is highly reactive. Therefore, in the case of a larger amount of the sulfuric acid catalyst, the acyl substitution degree of 6-position is decreased. Accordingly, to synthesize cellulose acylate used in the present invention, it is necessary that the amount of the sulfuric acid catalyst is reduced as much as possible and to compensate the reaction rate having been decreased thereby, reaction duration is extended.

Incidentally, coloring of a cellulose acylate film affects optical usage thereof. Therefore, the degree of yellow (yellow index, Y1) is preferably at most 3.0, more preferably at most 1.0. The degree of yellow can be measured based on JIS-K7103.

[Additives (Plasticizers)]

Plasticizers include, for example, an ester-based plasticizer formed from a polyol and a monovalent carboxylic acid and an ester-based plasticizer formed form a polycarboxylic acid and a monohydric alcohol. These ester-based plasticizers are preferable due to enhanced affinity with a cellulose ester.

Ethylene glycol ester-based plasticizers which are included in one of the polyol ester-based plasticizers: specifically, there are listed ethylene glycol alkyl ester-based plasticizers such as ethylene glycol diacetate or ethylene glycol dibutyrate; ethylene glycol cycloalkyl ester-based plasticizers such as ethylene glycol dicyclopropyl carboxylate or ethylene glycol dicyclohexyl carboxylate; and ethylene glycol aryl ester-based plasticizers such as ethylene glycol dibenzoate or ethylene glycol di-4-methyl benzoate. These alkylate, cycloalkylate, and arylate groups may be the same or different and may further be substituted. Mixtures of these alkylate, cycloalkylate, and arylate groups are employable, and further, these substituents may be bonded to each other by covalent bonding. Further, the ethylene glycol portion may be substituted, and a partial structure of the ethylene glycol ester may be partially or regularly introduced into the polymer as a pendant group, or further may be introduced into part of the molecular structure of an additive such as an antioxidant, an acid scavenger, or a UV absorbent.

Glycerin ester-based plasticizers which are included in one of the polyol ester-based plasticizers: specifically, there are listed glycerin alkyl esters such as triacetin, tributyrin, glycerin diacetate caprylate, or glycerin oleate propionate; glycerin cycloalkyl esters such as glycerin tricyclopropyl carboxylate or glycerin tricyclohexyl carboxylate; glycerin aryl esters such as glycerin tribenzoate or glycerin 4-methylbenzoate; diglycerin alkyl esters such as diglycerin tetraacetylate, diglycerin tetrapropionate, diglycerin acetate tricaprylate, or diglycerin tetralaurate; diglycerin cycloalkyl esters such as diglycerin tetracyclobutyl carboxylate or diglycerin tetracyclopentyl carboxylate; and diglycerin aryl esters such as diglycerin tetrabenzoate or diglycerin 3-methylbenzoate. These alkylate, cycloalkyl carboxylate, and arylate groups may be same or different and may further be substituted. Mixtures of these alkylate, cycloalkyl carboxylate, and arylate groups are employable, and further, these substituents may be bonded to each other by covalent bonding. Further, the glycerin and diglycerin portions may be substituted and a partial structure of the glycerin ester or diglycerin ester may be partially or regularly introduced into the polymer as a pendant group, or further may be introduced into part of the molecular structure of an additive such as an antioxidant, an acid scavenger, or a UV absorbent.

As other ester-based plasticizers, polyol ester-based plasticizers described, for example in paragraphs 30-33 of Unexamined Japanese Patent Application Publication No. 2003-12823 are cited.

These alkylate, cycloalkyl carboxylate, and arylate groups may be same or different and may further be substituted. Mixtures of these alkylate, cycloalkyl carboxylate, and arylate groups are employable, and further, these substituents may be bonded to each other by covalent bonding. Further, the polyol portion may be substituted and a partial structure of the polyol may be partially or regularly introduced into the polymer as a pendant group, or further may be introduced into part of the molecular structure of an additive such as an antioxidant, an acid scavenger, or a UV absorbent.

Of the above ester-based plasticizers formed from a polyol and a monovalent carboxylic acid, alkylpolyol aryl esters are preferable. Specifically, there are listed ethylene glycol dibenzoate, glycerin tribenzoate, and diglycerin tetrabenzoate as described above, as well as exemplified compound 16 described in paragraph 32 of Unexamined Japanese Patent Application Publication No. 2003-12823.

Dicarboxylic acid eater-based plasticizers which are included in one the polycarboxylic acid ester-based plasticizers: specifically, there are listed alkyl dicarboxylic acid alkyl ester-based plasticizers such as didodecyl malonate (C1), dioctyl adipate (C4), or dibutyl sebacate (C8); alkyl dicarboxylic acid cycloalkyl ester-based plasticizers such as dicyclopentyl succinate or dicyclohexyl adipate; alkyl dicarboxylic acid aryl ester-based plasticizers such as diphenyl succinate or di-4-methyl phenyl glutarate; cycloalkyl dicarboxylic acid alkyl ester-based plasticizers such as dihexyl-1, 4-cyclohexane dicarboxylate or didecyl bicyclo[2.2.1]heptane-2,3-dicarboxylate; cycloalkyl dicarboxylic acid cycloalkyl ester-based plasticizers such as dicyclohexyl-1,2-cyclobutane dicarboxylate or dicyclopropyl-1,2-cyclohexyl dicarboxylate; cycloalkyl dicarboxylic acid aryl ester-based plasticizers such as diphenyl-1,1-cyclopropyl dicarboxylate or di-2-naphthyl-1,4-cyclohexane dicarboxylate; aryl dicarboxylic acid alkyl ester-based plasticizers such as diethyl phthalate, dimethyl phthalate, dioctyl phthalate, dibutyl phthalate, or di-2-ethylhexyl phthalate; aryl dicarboxylic acid cycloalkyl ester-based plasticizers such as dicyclopropyl phthalate or dicyclohexyl phthalate; and aryl dicarboxylic acid aryl ester-based plasticizers such as diphenyl phthalate or di-4-methyl phenyl phthalate. These alkoxy and cycloalkoxy groups may be the same or different, or may be subjected to one substitution and these substituents may further be substituted. The alkyl group and the cycloalkyl group may be mixed, and these substituents may be bonded to each other by covalent bonding. Further, the aromatic ring of the phthalic acid may be substituted and may be a multimer such as a dimer, trimer, or tetramer. A partial structure of the phthalic acid ester may be partially or regularly introduced into the polymer as a pendant group, or further may be introduced into part of the molecular structure of an additive such as an antioxidant, an acid scavenger, or a UV absorbent.

As other polycarboxylic acid ester-based plasticizers, specifically, there are listed alkyl polycarboxylic acid alkyl ester-based plasticizers such as tridodecyl tricarbalate or tributyl-meso-butane-1,2,3,4-tetracarboxylate; alkyl polycarboxylic acid cycloalkyl ester-based plasticizers such as tricyclohexyl tricarbalate or tricyclopropyl-2-hydroxy-1,2,3-propane tricarboxylate; alkyl polycarboxylic acid aryl ester-based plasticizers such as triphenyl 2-hydroxyl-1,2,3-propane tricarboxylate or tetra 3-methyl phenyl tetrahydrofuran-2,3,4,5-tetracarboxylate, cycloalkyl polycarboxylic acid alkyl ester-based plasticizers such as tetrahexyl-1,2,3,4-cyclobutane tetracarboxylate or tetrabutyl 1,2,3,4-cyclopentane tetracarboxylate; cycloalkyl polycarboxylic acid cycloalkyl ester-based plasticizers such as tetracyclopropyl-1,2,3,4-cyclobutane tetracarboxylate or tricyclohexyl-1,3,5-cyclohexyl tricarboxylate; cycloalkyl polycarboxylic acid aryl ester-based plasticizers such as triphenyl-1,3,5-cyclohexyl tricarboxylate or hexa-4-methylphenyl-1,2,3,4,5,6-cyclohexyl hexacarboxylate; aryl polycarboxylic acid allyl ester-based plasticizers such as tridodecyl benzene-1,2,4-tricarboxylate or tetraoctyl benzene-1,2,4,5-tetracarboxylate; aryl polycarboxylic acid cycloalkyl ester-based plasticizers such as tricyclopentyl benzene-1,3,5-tricarboxylate or tetracyclohexyl benzene-1,2,3,5-tetracarboxylate; and aryl polycarboxylic acid aryl ester-based plasticizers such as triphenyl benzene-1,3,5-tetracarboxylate or hexa-4-methylphenyl benzene-1,2,3,4,5,6-hexacarboxylate. These alkoxy and cycloalkoxy groups may be the same or different, and may be subjected to one substitution and these substituents may further be substituted. The alkyl and cycloalkyl groups may be mixed, and these substituents may be bonded to each other by covalent bonding. Further, the aromatic ring of the phthalic acid may be substituted and may be a multimer such as a dimer, trimer, or tetramer. A partial structure of the phthalic acid ester may be partially or regularly introduced into the polymer as a pendant group, or further may be introduced into part of the molecular structure of an additive such as an antioxidant, an acid scavenger, or a UV absorbent.

Of the ester-based plasticizers formed from a polycarboxylic acid and a monohydric alcohol, dialkyl carboxylic acid alkyl esters are preferable. Specifically, dioctyl adipate and tridodecyl tricarbalate are listed.

Further, phosphoric acid ester-based plasticizers, carbohydrate ester-based plasticizers, and polymer plasticizers are listed.

Phosphoric acid ester-based plasticizers: specifically, there are listed phosphoric acid alkyl esters such as triacetyl phosphate or tributyl phosphate; phosphoric acid cycloalkyl esters such as tricyclopentyl phosphate or cyclohexyl phosphate; and phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphthyl phosphate, trixylyl phosphate, or tris ortho-biphenyl phosphate. These substituents may be the same or different, and may further be substituted. The alkyl, the cycloalkyl, and aryl groups may be mixed, and these substituents may be bonded to each other by covalent bonding.

Further, there are listed phosphoric acid esters including alkylene bis(dialkyl phosphates) such as ethylene bis(dimethyl phosphate) or butylene bis(diethyl phosphate); alkylene bis(diaryl phosphates) such as ethylene bis(diphenyl phosphate) or propylene bis(dinaphthyl phosphate); arylene bis(dialkyl phosphates) such as phenylene bis(dibutyl phosphate) or biphenylene bis(dibutyl phosphate); and arylene bis(diaryl phosphates) such as phenylene bis(diphenyl phosphate) or naphthylene bis(ditoluoyl phosphate). These substituents may be the same or different, and may further be substituted. The alkyl, cycloalkyl, and aryl groups may be mixed, and these substituents may be bonded to each other by covalent bonding.

Still further, a partial structure of the phthalic acid ester may be partially or regularly introduced into the polymer as a pendant group, or further may be introduced into part of the molecular structure of an additive such as an antioxidant, an acid scavenger, or a UV absorbent. Of these above compounds, phosphoric acid aryl esters and arylene bis(diaryl phosphates) are preferable, and specifically, triphenyl phosphate and phenylene bis(diphenyl phosphate) are preferable.

Next, carbohydrate ester-based plasticizers will now be described. Carbohydrate refers to monosaccharide, disaccharide, or trisaccharide in which saccharide exists in the form of pyranose or furanose (6-membered ring or 5-membered ring). Unlimited examples of carbohydrate include glucose, saccharose, lactose, cellobiose, mannose, xylose, ribose, galactose, arabinose, fructose, sorbose, cellotriose, and raffinose. Carbohydrate esters refer to those, in which a hydroxyl group of a carbohydrate and a carboxylic acid are dehydration-condensed to form an ester compound, referring, for details, to aliphatic carboxylic acid esters or aromatic carboxylic acid esters of carbohydrates. Aliphatic carboxylic acids include, for example, acetic acid and propionic acid, and aromatic carboxylic acids include, for example, benzoic acid, toluic acid, and anisic acid. Carbohydrate has hydroxyl groups of numbers corresponding to its type, and part of hydroxyl groups and a carboxylic acid may react to form an ester compound or all of the hydroxyl groups and a carboxylic acid react to form an ester compound. In the present invention, it is preferable that all the hydroxyl groups and a carboxylic acid react to form an ester compound.

As carbohydrate ester-based plasticizers, specifically, there can be preferably listed glucose pentaacetate, glucose pentapropionate, glucose pentabutyrate, saccharose octaacetate, and saccharose octabenzoate. Of these, saccharose octaacetate are more preferable.

Polymer plasticizers: specifically, there are listed aliphatic hydrocarbon-based polymers; alicyclic hydrocarbon-based polymers; acrylic polymers such as polyethyl acrylate, polymethyl methacrylate, or copolymers of methyl methacrylate and 2-hydroxyethyl methacrylate (for example, at any appropriate copolymerization ratio in the range of 1:99-99:1); vinyl-based polymers such as polyvinyl isobutyl ether or poly-N-vinyl pyrrolidone; styrene-based polymers such as polystyrene or poly-4-hydroxystyrene; polyesters such as polybutylene succinate, polyethylene terephthalate, or polyethylene naphthalate; polyethers such as polyethylene oxide or polypropylene oxide; polyamide; polyurethane, and polyurea. Number average molecular weight is preferably about 1000-500000, specifically preferably 5000-200000. In the case of at most 1000, volatility is problematic, and in the case of more than 500000, plasticizing ability decreases, which thereby adversely affects mechanical properties of a cellulose ester film. Any of these polymer plasticizers may be a homopolymer containing a single type of repeating unit or a copolymer containing plural repeating structural body. Further, the above polymers may be used in combination of at least 2 types thereof.

An acrylic polymer of a weight average molecular weight of 500-10000 may further be added to the protective films 114 and 116. The weight average molecular weight is preferably 500-5000. Thereby, a cellulose derivative film after film formation exhibits excellent transparency and extremely small moisture permeability, as well as demonstrating excellent performance as a polarizing plate protective film.

To synthesize such a polymer, the following method is preferable.

Such a polymerization method includes a method in which a peroxide polymerization initiator such as cumene peroxide or t-butyl hydroperoxide is used, a method in which a polymerization initiator is used more than in common polymerization, a method in which in addition to a polymerization initiator, a chain transfer agent such as a mercapto compound or carbon tetrachloride is used, a method in which in addition to a polymerization initiator, a polymerization terminator such as benzoquinone or dinitrobenzene is used, and a mass polymerization method in which a compound having a thiol group and a secondary hydroxyl group as described in Unexamined Japanese Patent Application Publication No. 2000-128911 or 2000-344823 or a polymerization catalyst in which the above compound and an organometallic compound are combined is used. Any of these is preferably used but the method described in either of the above publications is specifically preferable. An acrylic polymer preferably used in the present invention preferably contains an acrylic acid ester or a methacrylic acid ester at 40% by mass or more. Monomers as monomer units constituting such a polymer are listed below with no limitation thereto.

Acrylic acid esters include, for example, methyl acrylate, ethyl acrylate, propionyl (i-, and n-) acrylate, butyl (n-, i-, s-, and t-) acrylate, pentyl (n-, i-, and s-) acrylate, (n- and i-) hexyl acrylate, (n- and i-) heptyl acrylate, octyl (n- and i-) acrylate, nonyl (n- and i-) acrylate, myristyl (n- and i-) acrylate, cyclohexyl acrylate, (2-ethylhexyl)acrylate, benzyl acrylate, phenetyl acrylate, (ε-caprolactone) acrylate, (2-hydroxyethyl)acrylate, (2-hydroxypropyl)acrylate, (3-hydroxypropyl)acrylate, (4-hydroxybutyl)acrylate, (2-hydroxybutyl)acrylate, p-hydroxymethylphenyl acrylate, and p-(2-hydroxyethyl)phenyl acrylate. Methacrylic acid esters include those in which any of the above acrylic acid esters is changed to a methacrylic acid ester. Unsaturated acids include, for example, acrylic acid, methacrylic acid, maleic acid anhydride, crotonic acid, and itaconic acid. In addition, ethylenically unsaturated monomers copolymerizable with acrylic acid esters and methacrylic acid esters include, as vinyl esters, for example, vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexanecarboxylate, vinyl octylate, vinyl methacrylate, vinyl crotonate, vinyl sorbate, vinyl benzoate, and vinyl cinnamate. In the case of an acrylic acid or methacrylic acid ester monomer containing a hydroxyl group, the constituent unit of a homopolymer is not meant but the constituent unit of a copolymer is meant. In this case, an acrylic acid or methacrylic acid ester monomer unit containing a hydroxyl group is preferably contained in an acrylic polymer at 2-20% by mass.

Further, polymers containing hydroxyl groups in side chains thereof are usable. Monomer units containing a hydroxyl group are the same as the above monomers but acrylic acid or methacrylic acid esters are preferable, including, for example, (2-hydroxyethyl)acrylate, (2-hydroxypropyl)acrylate, (3-hydroxypropyl)acrylate, (4-hydroxybutyl)acrylate, (2-hydroxybutyl)acrylate, p-hydroxymethylphenyl acrylate, and p-(2-hydroxyethyl)phenyl acrylate, or those in which these acrylic acids are replaced with methacrylic acids. Preferable are 2-hydroxyethyl acrylate and 2-hydroxyethyl methacrylate. In a polymer, an acrylic acid ester or methacrylic acid ester monomer unit having a hydroxyl group is preferably contained at 2-20% by mass, more preferably 2-10% by mass based on the polymer. Those in which a polymer as described above contains a monomer unit having a hydroxyl group at 2-20% by mass can realize a retardation film in which excellent compatibility with a cellulose derivative, and also excellent retention ability and dimensional stability are expressed, and also when this retardation film is used for a polarizing plate protective film, a polarizing plate protective film such that adhesion performance to a polarizer is specifically excellent and durability of a polarizing plate is enhanced is provided. Further, at least one terminal of the main chain of a polymer preferably has a hydroxyl group. The method to allow a main chain terminal to have a hydroxyl group is not limited as long as an employed method therefor is one to specifically allow a terminal of the main chain to have a hydroxyl group. However, employable are a method to use a radical polymerization initiator having a hydroxyl group such as azobis(2-hydroxyethylbutyrate), a method to use a chain transfer agent having a hydroxyl group such as 2-mercaptoethanol, a method to use a polymerization terminator having a hydroxyl group, a method to incorporate a hydroxyl group at terminals via living ionic polymerization, and a mass polymerization method in which a compound having a thiol group and a secondary hydroxyl group as described in Unexamined Japanese Patent Application Publication No. 2000-128911 or 2000-344823 or a polymerization catalyst in which the above compound and an organometallic compound are combined is used. The method described in either of the publications is specifically preferable. Polymers produced by the method as described in either of the publications are commercially available as ACTFLOW SERIES (produced by Soken Chemical & Engineering Co., Ltd), which are preferably used. A polymer having a hydroxyl group at a terminal and a polymer having hydroxyl groups in side chains as described above produces the effect to remarkably enhance the compatibility and transparency of the polymer.

Any impurities such as residual acids, inorganic salts, or organic low molecular compounds carried over from during production or generated during storage are preferably removed from a plasticizer, similarly to the above cellulose ester, and purity is preferably at least 99%. The residual acids and water are preferably in the range of 0.01-100 ppm, whereby in melt film formation using a cellulose resin, thermal degradation is inhibited, and film forming stability and optical and mechanical properties of the film are enhanced.

[Additives (Antioxidants)]

Decomposition of a cellulose ester is accelerated not only by heat but also by oxygen under a high temperature ambience such that melt film formation is carried out. Therefore, in the cellulose acylate of the present invention, an antioxidant serving as a stabilizer is preferably used.

As antioxidants useful in the present invention, any appropriate compounds inhibiting degradation of a melt forming material caused by oxygen are usable. Of these, useful antioxidants include phenol-based compounds, hindered amine-based compounds, phosphor-based compounds, sulfur-based compounds, heat resistant processing stabilizers, and oxygen scavengers. Of these, phenol-based compounds, hindered amine-based compounds, phosphor-based compounds, and lactone-based compounds are specifically preferable.

As hindered amine compounds (HALS's), preferable are 2,2,6,6-tetraalkyl piperidine compounds as described, for example, in columns 5-11 of U.S. Pat. No. 4,619,956 specification and columns 3-5 of U.S. Pat. No. 4,839,405 specification, or acid adduct salts thereof or complexes thereof with metal compounds. LA52 (produced by Adeka Corp.) is cited as a commercially available product.

As lactone-based compounds, compounds described in Unexamined Japanese Patent Application Publication Nos. 7-233160 and 7-247278 are listed.

These stabilizers can be used individually or in combination of at least 2 types thereof. The blending amount thereof is appropriately selected in a range in which the object of the present invention is not damaged, being commonly 0.001-10.0 parts by mass based on 100 parts by mass of a cellulose ester, preferably 0.01-5.0 parts by mass, more preferably 0.1-3.0 parts by amass.

Blending of these compounds makes it possible to prevent coloring and strength decrease of a formed body resulting from heat during melt formation and thermal oxidation degradation without the decrease of transparency and heat resistance.

The added amount of an antioxidant is commonly 0.001-10 parts by mass based on 100 parts by mass of a cellulose ester, preferably 0.05-5.0 parts by mass, more preferably 0.1-3 parts by amass.

[Additives (Acid Scavengers)]

An acid scavenger is an agent to take a role to trap acids (protonic acids) remaining in a cellulose ester carried over from during production. Further, when a cellulose ester is melted, hydrolysis of side chains is accelerated by moisture and heat in the polymer, and in CAP, acetic acid and propionic acid are generated. Any compounds chemically bondable to acids are employable, including compounds having an epoxy, tertiary amine, ether structure with no limitation thereto.

Specifically, epoxy compounds as acid scavengers as described in U.S. Pat. No. 4,137,201 specification are preferably contained. Such epoxy compounds as acid scavengers are conventionally well known in the art, including glycidyl ether of polyglycols, specifically polyglycols derived via condensation of about 8-40 moles of ethylene oxide per mole of a polyglycol, diglycidyl ether of glycerol, metal epoxy compounds (for example, ones having been conventionally used in a vinyl chloride polymer composition and together with a vinyl chloride polymer composition), epoxidized ether condensates, diglycidyl ether of bisphenol A (i.e., 4,4'-dihydroxydiphenyldimethylmethane), epoxidized unsaturated fatty acid esters (specifically esters of a fatty acid having 2-22 carbon atoms and an alkyl group having about 2-4 carbon atoms (e.g., butyl epoxystearate), and epoxidized long chain fatty acid triglycerides (e.g., epoxidized vegetable oil typified and exemplified by a composition such as epoxidized soybean oil and other unsaturated natural oils (these are sometimes referred to as epoxidized natural glycerides or unsaturated fatty acids, and these fatty acids commonly contain 12-22 carbon atoms)).

[Additives (UV Absorbents)]

As UV absorbents, preferable are those exhibiting excellent absorption ability of UV radiation of a wavelength of at most 370 nm from the viewpoint of degradation prevention of a polarizer and a display device against UV radiation and having small absorption of the visible light of a wavelength of at least 400 nm from the viewpoint of liquid crystal display performance.

For example, there are listed salicylic acid-based UV absorbents (e.g., phenyl salicylate and p-tert-butyl salicylate); benzophenone-based UV absorbents (e.g., 2,4-dihydroxybenzophenone and 2,2'-dihydroxy-4,4'-dimethoxybenzophenone); benzotriazole based UV absorbents (e.g., 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)) benzotriazole, 2-(2'-hydroxy-3'-dodecyl-5'-methylphenyl)benzotriazole, 2-(2'-hydroxy-3'-tert-butyl-5-(2-octyloxycarbonylethyl)-phenyl)-5-chlorobenzotriazole, 2-(2'-hydroxy-3'-(1-methyl-1-phenylethyl)-5'-(1,1,3,3-tetramethylbutyl)-phenyl) benzotriazole, and 2-(2'-hydroxy-3',5'-di-(1-methyl-1-phenylethyl)-phenyl)benzotriazole); cyanoacrylate-based UV absorbents (e.g., 2'-ethylhexyl-2-cyano-3,3-diphenylacrylate and ethyl-2-cyano-3-(3',4'-methylenedioxyphenyl)-acrylate); triazine-based UV absorbents; the compounds described in Unexamined Japanese Patent Application Publication Nos. 58-185677 and 59-149350; nickel complex salt-based compounds; and inorganic powder.

As UV absorbents according to the present invention, preferable are benzotriazole-based UV absorbents and triazine-based UV absorbents, which exhibit high transparency and produce the effect of preventing degradation of a polarizing plate and a liquid crystal element. Of these, benzotriazole-based UV absorbents having more appropriate absorption spectrum are specifically preferable.

Well-known benzotriazole-based UV absorbents specifically preferably used together with UV absorbents according to the present invention may be bis-type ones, including, for example, 6,6'-methylenebis(2-(2H-benzo[d][1,2,3]triazole-2-yl)-4-(2,4,4,-trimethylpentane-2-yl)phenol and 6,6-methylenebis(2-(2H-benzo[d][1,2,3]triazole-2-yl)-4-(2-hydroxyethyl)phenol).

Further, in the present invention, any appropriate combination can be made with well-known UV absorbing polymers. Such well-known UV absorbing polymers are not specifically limited, including, for example, a polymer obtained via homo-polymerization of RUVA-93 (produced by Otsuka Chemical Co., Ltd.) and a polymer obtained via copolymerization of RUVA-93 and another monomer. Specifically, there are listed PUVA-30M in which RUVA-93 and methyl methacrylate are copolymerized at a ratio (by mass) of 3:7 and PUVA-50M obtained via copolymerization thereof at a ratio (by mass) of 5:5, as well as the polymers described in Unexamined Japanese Patent Application Publication No. 2003-113317.

Also usable are, as commercially available products, TINUVN 109, TINUVIN 171, TINUVIN 360, TINUVIN 900, TINUVIN 928, (all produced by Ciba Japan K.K.), LA-31 (produced by Adeka Corp.), and RUVA-100 (Otsuka Chemical Co., Ltd.).

Specific examples of benzophenone compounds include 2,4-dihydroxybenzophenone, 2,2% dihydroxy-4-methoxybenzophenone, 2-hydroxy-4-methoxy-5-sulfobenzophenone, and bis(2-methoxy-4-hydroxy-5-benzoilphenylmethane) with no limitation thereto.

In the present invention, a UV absorbent is preferably added at 0.1-20 by mass, more preferably at 0.5-10% by mass. still more preferably at 1-5% by mass. At least 2 types thereof may be combined.

[Additives (Viscosity Reducing Agents)]

In the present invention, to reduce melt viscosity, a hydrogen bonding solvent can be added. Such a hydrogen boding solvent refers to an organic solvent enabling to form hydrogen atom-mediated "bonding" generated between an electrically negative atom (e.g., oxygen, nitrogen, fluorine, and chlorine) and a hydrogen atom covalent-bonded to such an electrically negative atom, i.e., an organic solvent having large bonding moment and enabling to allow molecules adjacent to each other to be arranged, for example, by incorporating O—H (oxygen-hydrogen bonding), N—H (nitrogen-hydrogen bonding), or F—H (fluorine-hydrogen bonding), as described in J. N. Israelacbiviri, "Intermolecular and Surface Forces" (translated by Tamotsu Kondoh and Hiroyuki Ooshima, published by The McGraw-Hill Companies, Inc., 1991). This solvent has the ability to form enhanced hydrogen bonding between celluloses compared with intermolecular hydrogen bonding in a cellulose resin. In the melt casting method used in the present invention, the melt temperature of a cellulose resin composition can be decreased by adding a hydrogen bonding solvent, compared with the glass transition temperature of a single cellulose resin used. Or, at the same melt temperature, the melt viscosity of a cellulose resin composition containing a hydrogen bonding solvent can be decreased compared in a cellulose resin.

[Additives (Matting Agents)]

In the present embodiments, to provide lubricating properties of a film, a matting agent is preferably added. The matting agent used in the present embodiments may be either an inorganic compound or an organic compound, as long as the transparency of a film to be obtained is not impaired and heat resistance during melt processing is ensured, including, for example, talc, mica, zeolite, diatomaceous earth, calcined diatomaceous earth, kaolin, sericite, bentonite, smectite, clay, silica, quartz powder, glass beads, glass powder, glass flake, milled fiber, wollastonite, boron nitride, boron carbide, titanium borate, magnesium carbonate, heavy calcium carbonate, light calcium carbonate, calcium silicate, aluminum silicate, magnesium silicate, magnesium aluminosilicate, alumina, silica, zinc oxide, titanium dioxide, iron oxide, magnesium oxide, zirconium oxide, aluminum hydroxide, calcium hydroxide, magnesium hydroxide, calcium sulfate, barium sulfate, silicon carbide, aluminum carbide, titanium carbide, aluminum nitride, silicon nitride, titanium nitride, and white carbon. These matting agents may be used individually or in combination of at least two types. When particles differing in particle diameter and shape (e.g., acicular and spherical particles) are combined, transparency and lubricating properties can be allowed to be highly compatible. Of these, silicon dioxide exhibiting excellent transparency (less haze) due to its refractive index close to that of a cellulose ester is specifically preferably used. As specific examples of silicon dioxide, there can be preferably used commercially available products having trade names such as AEROSIL 200V, AEROSIL R972V, AEROSIL R972, R974, R812, 200, 300, R202, OX 50, TT 600, and NAX 50 (produced by Nihon Aerosil Co., Ltd.); SEAHOSTAR KEP-10, SEAHOSTAR KEP-30, and SEAHOSTAR KEP-50 (produced by Nippon Shokubai Co., Ltd.); SYLOPHOBIC 100 (produced by Fuji Silysia Chemical Ltd.), NIPSEAL E220A (produced by Nippon Silica Industry Co.), and ADMAFINE SO (produced by Admatechs Co., Ltd.). As the shape of particles, amorphous, acicular, flat, and spherical ones are used with no specific limitation. Of these, spherical particles are specifically preferable since a film obtained can exhibit excellent transparency. The size of a particle is preferably smaller than the wavelength of the visible light since when the size thereof is close to the wavelength of the visible light, light scatters, resulting in degraded transparency. This size is more preferably at most half the wavelength of the visible light. When the size of the particle is excessively small, lubrication properties may not improved. Therefore, the range of 80 nm-180 nm is specifically preferable. Herein, the size of a particle refers to the size of an aggregate when particles are formed as an aggregate of primary particles. Further, when a particle is not spherical, the diameter of a circle equivalent to its projected area is meant.

[Hard Coat Layer]

As shown in FIG. 1, in the polarizing plate 110, a hard coat layer 118 is formed on a protective film 114. The hard coat layer 118 is formed in such manner that a certain coating liquid (coating solvent) is coated and dried on a protective film 114.

The thickness of the hard coat layer 118 is at most 6 μm. The thickness of the mixed region of the protective film 114 and the hard coat layer 118 (the penetrating region of a coating liquid into the protective film 114) is 1-20% of that of the hard coat layer 118.

Herein, "mixed region (%)" is a value obtained in such a manner that an SEM image is taken and the image is subjected to calorimetric measurement using a colorimeter, being calculated based on the following expression.

Mixed region (%)=mixed region thickness (μm)/{hard coat layer 118 thickness except for the mixed region (μm)+mixed region thickness (μm)+protective film 114 thickness (μm)}×100

[Polarizing Plates]

In the present embodiments, a hard coat film 130 is structured by forming a hard coat layer 118 on a protective film 114. The thickness of the hard coat film 130 (i.e., the sum of the thickness of the protective film 114 and the thickness of the hard coat layer 118) is less than 40 μm. Then, the entire thickness of a polarizing plate 110 containing a polarizer 112, two protective films 114 and 116, and a hard coat layer 118 is less than 90 μm.

On the other hand, a polarizing plate 120 has the same constitution as the polarizing plate 110 except that in the polarizing plate 110, a layer corresponding to the hard coat layer 118 is not formed. Namely, the polarizing plate 120 has a polarizer 122 and two protective films 124 and 126, and the polarizer 122 is structured by being sandwiched by the protective films 124 and 126.

The polarizing plates 110 and 120 provided with the above constitution can be used for the MVA (Multi-domain Vertical Alignment) mode, the PVA (Patterned Vertical Alignment) mode, the CPA (Continuous Pinwheel Alignment) mode, the OCB (Optical Compensated Bend) mode, and the IPS (In-Plane Switching) mode.

A liquid crystal panel 100 as a liquid crystal display device is applied as a colorized, moving image display device. The display quality thereof has been improved by the present invention, and then contrast improvement and durability enhancement of a polarizing plate have been realized, resulting in the possibility of moving image display causing minimal eye fatigue and showing fidelity.

[Production Method]

Next, the method for producing a liquid crystal panel 100 (containing the method for producing a protective film, the method for producing a hard coat film, and the method for producing a polarizing plate) will be described.

[Protective Film Production Method]

Protective films 114, 116, 124, and 126 can be produced by either a melt casting method or a solution casting method. In the following description, the method for producing the protective films 114, 116, 124, and 126 will be described separately using the melt casting method and the solution casting method.

[Protective Film Production Method (Melt Casting Method)]

The melt casting film forming method is categorized into a forming method to carry out heat-melting, including a melt extrusion forming method, a press forming method, an inflation method, an injection forming method, a blow forming method, and a stretching forming method. Of these, to obtain an optical film exhibiting excellent mechanical strength and surface accuracy, a melt extrusion method employing a die is most advantageous.

Then, the melt extrusion method is exemplified and also a protective film production apparatus and a method for producing a protective film are described below.

Figure 2:
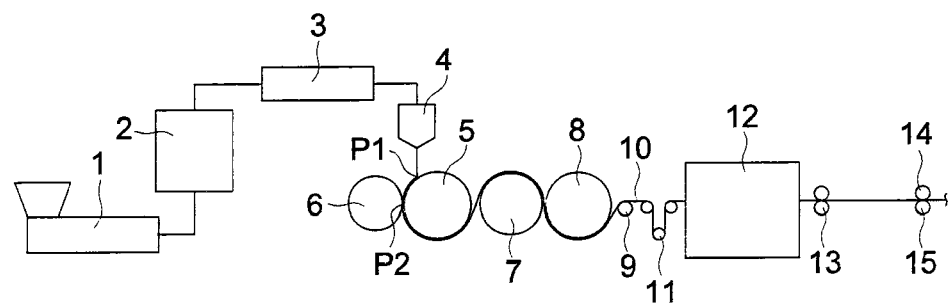
FIG. 2 is a view showing a schematic constitution of a protective film production apparatus according to the preferred embodiments of the present invention.

As shown in FIG. 2, the protective film production apparatus has an extruder 1, a filter 2, a static mixer 3, and a casting die 4 in the order of processing a film constituting material (from the upstream to the downstream).

The extruder 1 is an apparatus to extrude a film constituting material in the state of being heat-melted.

The filter 2 removes foreign materials by filtering a film constituting material. As the filter 2, a metal nonwoven filter having a plurality of filtering layers is used.

Figure 4A:
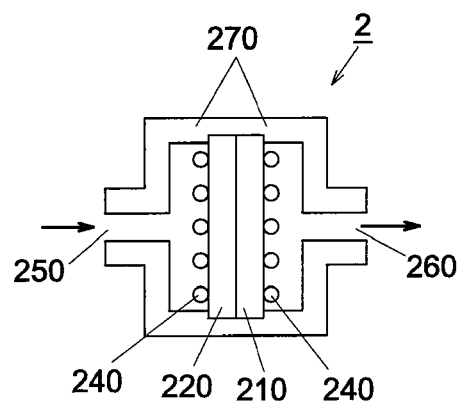
FIG. 4 includes views showing a schematic constitution of the filter of FIG. 2.

The filter 2 is a metal nonwoven filter, which is formed of a plurality of layers (filtering layers 210, 220, and 230) in which metal fiber nonwoven is compressed and sintered. For details, as shown in FIG. 4A, the filter 2 has a housing 270, and in the housing 270, an inflow opening 250 and an outflow opening 260 of a filtrate are formed. In the interior of the housing 270, the filtering layers 210 and 220 are provided. The filtering layer 210 and the filtering layer 220 are provided on the outflow opening 260 side and on the inflow opening 250 side, respectively. The filtering layers 210 and 220 each are provided with a protective mesh 240 for protection thereof.

Figure 4B:
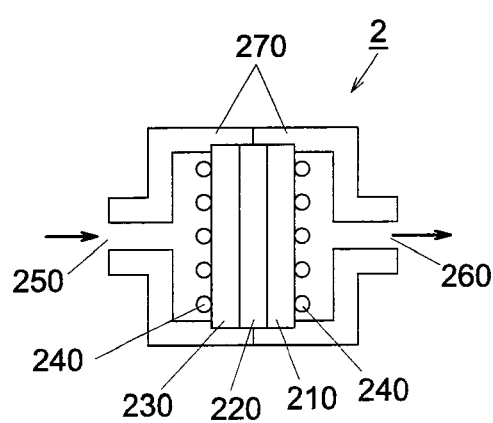

Herein, the number of layers of the filtering layers (210 and 220) may be one or may be three in which a filtering layer 230 is provided as shown in FIG. 4B, or even at least four.

It is preferable that the filter 2 has a fiber density of 1500-2000 g/cm², and the average diameter of metal fiber of the filtering layer 210 on the most downstream side is 2-6 μm and the average diameter of metal fiber of the filtering layers 220 and 230 on the upstream side from the filtering layer 210 is 4-12 μm.

When these conditions are satisfied, a film free from die line occurrence and having less polarizing foreign materials and no color change such as yellowing can be produced.

The fiber density of the filter 2 refers to the weight of a filter layer per area, employing, even in the case of a plurality of layers, the weight of all the layers ranging flow the layer of the entrance side of a filtrate to the exit side. Herein, the weight of the protective mesh 240 is excluded.

When the average diameter of the metal fiber of the filtering layer 210 on the most downstream side of the filter 2 is less than 2 μm, a melted thermoplastic resin is loaded with large shearing stress and thereby during film formation, die lines occur.

When the average diameter of the metal fiber of the filtering layer 210 on the most downstream side is more than 6 μm, inadequate foreign material collecting ability is expressed.

When the average diameter of the metal fiber of the filtering layers 220 and 230 located on the upstream side of the filtering layer 210 on the most downstream side is less than 4 μm, a melted thermoplastic resin is loaded with large shearing stress and thereby during film formation, die lines occur.

When the average diameter of the metal fiber of the filtering layers 220 and 230 located on the upstream side of the filtering layer 210 on the most downstream side is mores than 12 μm, relatively large foreign materials to be collected by a preceding layer pass through the layer and reach the bottom layer and thereby clogging of the filter occurs at an early stage, whereby due to filter replacement, productivity decreases and then production cost increases.

Figure 5A:
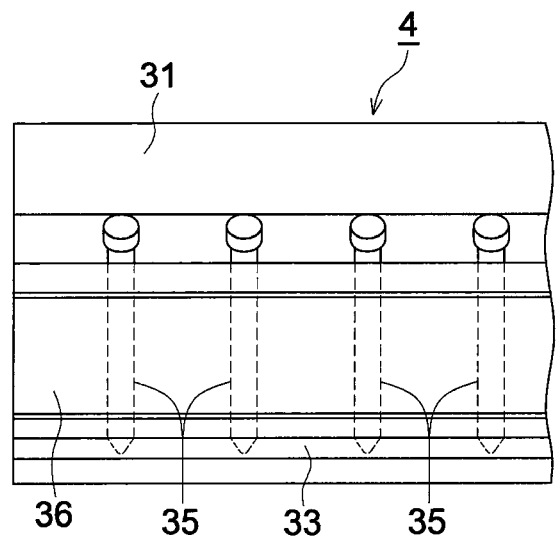
FIG. 5 includes views showing a schematic constitution of the casting die of FIG. 2.
Figure 5B:
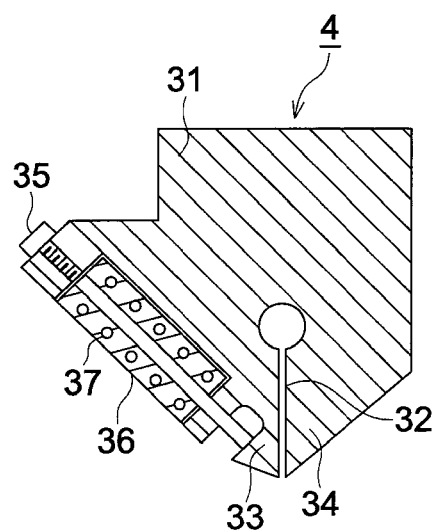

As shown in FIG. 5, in the casting die 4, a slit 32 in which a gap (clearance) is adjustable is formed. Of a pair of lips forming the slit 32 of the casting die 4, one is a flexible lip 33 and the other is a fixed lip 43.

As the casting die 4, there are used those in which hard chromium, chromium carbide, chromium nitride, titanium carbide nitride, titanium nitride, super steel, or ceramic (tungsten carbide, aluminum oxide, and chromium oxide) is treated by spraying or plating, followed, as surface processing, by processing such as buffing, lapping using a grinding stone of #1000 or less, surface shaving using a diamond grinding stone of #1000 or more (the shaving direction is in the direction vertical to the flow direction of the resin), electropolishing, and electrolytic composite polishing.

A preferable material of the lip portions (the flexible lip 33 and the fixed lip 34) of the casting die 4 is the same as for the casting die 4.

The surface accuracy of the lip portions (the flexible lip 33 and the fixed lip 34) is preferably at most 0.5 S, more preferably at most 0.2 S.

In the transverse direction of the casting die 4, i.e., in the longitudinal direction of the slit 32, a large number of heat bolts 35 are aligned at a certain pitch. Each heat bolt 35 preferably has a length of 20-40 cm and a diameter of 7-14 mm. And, a plurality of, for example, several tens of such heat bolts 35 are preferably aligned at a pitch of 20-40 mm.

Each heat bolt 35 is provided with a block 36 having an embedded electric heater 37 and a cooling medium pathway, and each heat bolt 35 penetrates each block 36 vertically.

The base portion of the heat bolt 35 is fixed to the die main body 31, and the tip portion thereof is in contact with the outer face of the flexible lip 33.

In the casting die 4, as the block 36 is always air-cooled, the input of the embedded electric heater 37 is increased and decreased and thereby the temperature of the block 36 is increased and decreased, whereby the heat bolts 35 are subjected to thermal elongation and contraction and then the flexible lip 33 is displaced to adjust the thickness of the film.

Herein, it is possible that at a given position of the downstream of the casting die 4, a thickness meter is placed; web thickness information detected thereby is fed back to a control device; this thickness information is compared with set thickness information by the control device; and by a signal of correction control amount sent from the device, the power or on-rate of the heating body of the heat bolt 35 is controlled.

Further, instead of the heat bolt 35, a gap adjusting member mainly having a bolt, in which by manual forward and backward movement in the axial direction, the gap of the slit 32 is adjusted, may be provided.

The gap of the slit 32 adjusted by the gap adjusting member is commonly 200-1000 μm, preferably 300-800 μm, more preferably 400-600 μm.

As show in FIG. 2, on the downstream side of the casting die 4 in the processing order of a film constituting material, a first-third cooling rolls 5, 7, and 8 are provided.

The first-third cooling rolls 5, 7, and 8 are made of a seamless steel pipe having a wall thickness of about 20-30 mm and the surface thereof is mirror-finished.

The interior of the first-third cooling rolls 5, 7, and 8 is constituted in such a manner that a pipeline to allow a cooling liquid to flow is arranged and thereby the cooling liquid flowing in the pipeline can absorb heat from the film constituting material on the roll.

Of the first-third cooling rolls 5, 7, and 8, the first cooling roll 5 makes contact with a touch roll 6.

The touch roll 6 has a surface exhibiting elasticity, being deformed along the surface of the first cooling roll 5 by the pressing power against the first cooling roll 5 to form a nip between the touch roll 6 and the first roll 5.

Figure 6:
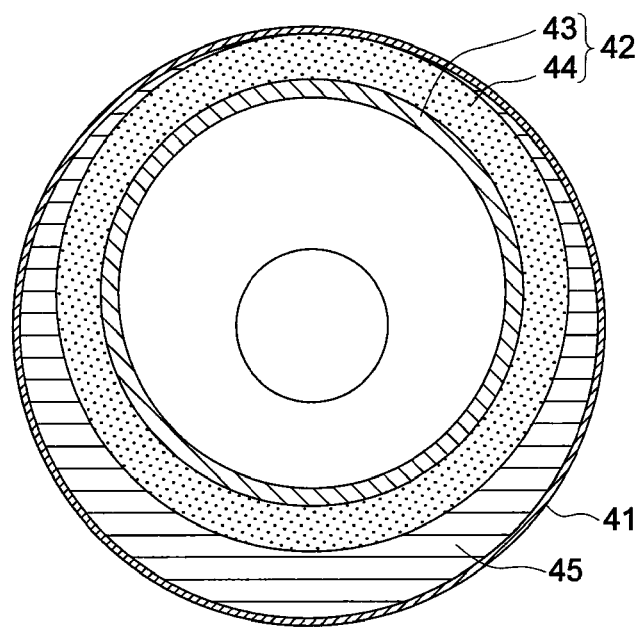
FIG. 6 is a view sowing a schematic constitution of the touch roll of FIG. 2.
Figure 7:
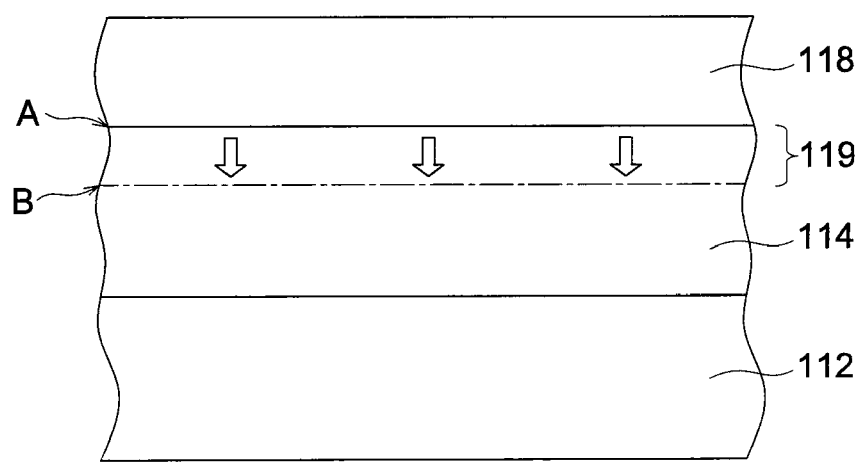
FIG. 7 is a view to illustrate problems in a conventional polarizing plate.

As shown in FIG. 6, the touch roll 6 is constituted in such manner that a metal sleeve 41 exhibiting flexibility and an elastic roller 42 are provided and in the interior of the metal sleeve 41, the elastic roller 42 is arranged.

The metal sleeve 41 is made of a stainless steel of a thickness of 0.3 mm, exhibiting flexibility. When the metal sleeve 41 is excessively thin, inadequate strength is expressed. In contrast, in the case of being excessively thick, inadequate flexibility is expressed. Thereby, the thickness of the metal sleeve 41 is preferably 0.1-1.5 mm.

The elastic roller 42 has a metal inner cylinder 43 and a rubber 44 rotatable via a bearing, being formed into a roll by providing the rubber 44 for the surface of the cylinder 43.

When the touch roll 6 is pressed against the first cooling roll 5, the elastic roller 42 allows the metal sleeve 41 to be pressed against the first cooling roll 5. Then, as the metal sleeve 41 and the elastic roller 42 are deformed into a shape depending on the shape of the first cooling roll 5, a nip is formed between the touch roll and the first cooling roll.

In the interior of the metal sleeve 41, a cooling water 45 is allowed to flow in a space portion formed between the metal sleeve and the elastic roller 42.

The touch roll 6 is energized toward the first cooling roll 5 by an unshown energizing member. When the energizing force of the energizing member is designated as F and the width of a film in the nip in the direction along the rotation shaft of the first cooling roll 5 is designated as W, linear pressure value F/W is preferably set at 10-150 N/cm.

The material of the first-third cooling rolls 5, 7, and 8 is preferably carbon steel, stainless steel, or a resin.

The surface accuracy of the first-third cooling rolls 5, 7, and 8 is preferably enhanced, being, as surface roughness, at most 0.3 S, more preferably at most 0.01 S.

As shown in FIG. 2, on the downstream side of the third cooling roll 8 in the processing order of a film constituting material, a peeling roll 9, a dancer roll 10 (film tension adjusting roll), and a stretcher 12 are provided.

On the downstream side of the stretcher 12 in the processing order of the film constituting material, a slitter 13, an embossing ring 14, and a back roll 15 are provided. The embossing ring 14 and the back roll 15 are oppositely arranged and a knurling apparatus is constituted of these 2 members.

The method for producing a protective film will roughly be described.

(1) A cellulose ester resin and additives are mixed to prepare a film constituting material, and using the extruder 1, the film constituting material is extruded in the state of being heat-melted.

(2) Then, using the filter 2, the film constituting material is filtered to remove foreign materials.

(3) Then, using the static mixer 3, the film constituting material is mixed.

(4) Subsequently, the film constituting material is extruded onto the first cooling roll 5 from the casting die 4 in the state of being melted.

(5) At this moment; the film constituting material is circumscribed around the first cooling roll 5 and further circumscribed in sequence around the 3 cooling rolls of the second cooling roll 7 and the third cooling roll 8 including the first cooling roll 5 in total, followed by being cooled and solidified to produce a film precursor 10.

Herein, the surface of the first cooling roll 5 is being pressed by the touch roll 6 and then the melted film constituting material is nipped between the first cooling roll 5 and the touch roll 6 to be reformed to be flat.

(6) Thereafter, the film precursor 9 is peeled by the peeling roll 9 and the thus-peeled film precursor 10 is stretched in the transverse direction by holding both edges of the film using the stretcher 12.

(7) Subsequently, the edges of the stretched film are slit to a product width by the slitter 13 to be cut off. Then, using the knurling apparatus (the embossing ring 14 and the back roll 15), both edges of the film are knurled (embossed).

The steps of the above (1)-(7) will now be detailed.

(1) First Extrusion Step

In a first extrusion step, as described above, a film constituting material is mixed, and then the mixture may be directly melted using the extruder 1 or it is possible that the film constituting material is temporarily formed into pellets and the pellets are melted using the extruder 1.

In the first extrusion step, when no additives such as a plasticizer are previously mixed, during the operation of the extruder 1, additives may be kneaded.

(2) Filtering Step

In the filtering step, a thermoplastic resin is a cellulose acylate resin, and filtering temperature during filtration using a metal nonwoven filter 2 is preferably 230-260° C., more preferably 240-250° C.

When the temperature of a melted thermoplastic resin is less than 230° C., viscosity increases, resulting in small filtration rate, which is unfavorable. Further, when the temperature is more than 260° C., the viscosity decreases but resin coloring may occur, which is unfavorable.

Filtration pressure is 1-15 Mpa. Filtration is carried out using the metal nonwoven filter 2 to remove foreign materials. When the filtration pressure is less than 1 Mpa, the residence time of a cellulose acylate melt in the filtering apparatus is extended, resulting in the possibility of yellowing due to thermal degradation. When the filtration pressure is more than 10 Mpa, the filter may be broken.

(3) Mixing Step

In the mixing step, for uniform addition, a mixing apparatus such as a static mixer 3 is preferably used.

In the present embodiments, a cellulose resin and additives such as a stabilizer added as appropriate are preferably mixed prior to melting.

Such a cellulose resin and additives are more preferably mixed initially.

Mixing may be carried out using a mixer or in the above resin preparing step.

When a mixer is used, usable is a common mixer such as a V-type mixer, a conical screw-type mixer, a horizontal cylindrical mixer, a HENSCHEL mixer, or a ribbon mixer.

(4) Second Extrusion Step

In the extrusion step, a film constituting material having been filtered using the metal nonwoven filter 2 is sent to the casting die 4 to be extruded into a film shape from the slit 32 of the casting die 4.

The casting die 4 is not specifically limited if used to produce a sheet or film.

(5) Cooling Step

Figure 3:
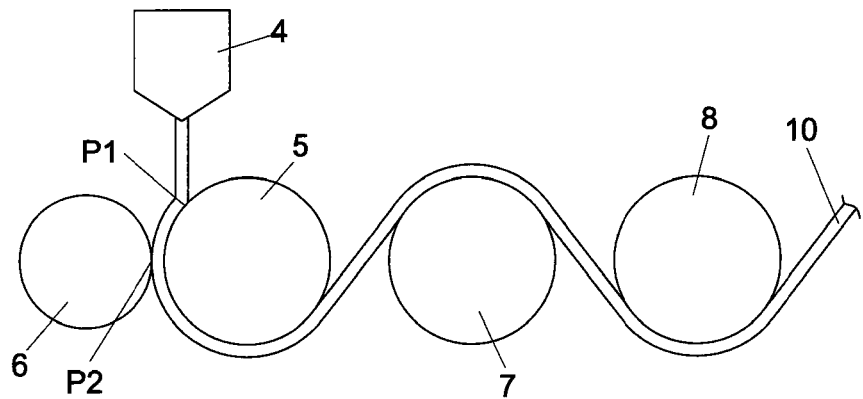
FIG. 3 is a view showing a schematic constitution of a part leading from the casting die to the cooling roll of FIG. 2.

In the cooling step, as shown in FIG. 3, as a film-shaped cellulose ester resin in the state of being melted is brought into close contact with the first cooling roll 5, the second cooling roll 7, and the third cooling roll 8 in this sequential order and conveyed, cooling and solidification are carried out to obtain an unstretched cellulose ester-based resin film (a film precursor 10).

(6) Stretching Step

In the stretching step, an unstretched film precursor 10 after cooled/solidified which has been peeled from the third roll 8 by the peeling roll 9 is introduced into the stretcher 12 vie the dancer roll 11 to be stretched in the horizontal direction (the transverse direction) at this position. This stretching is allows molecules within the film precursor 10 to be oriented.

As the method to stretch the film in the transverse direction, a well-known tenter can be preferably used.

When specifically, the stretching direction is allowed to be the transverse direction, lamination with a polarizer can be carried out in the roll state, which is preferable.

When stretching is carried out in the transverse direction, the delayed phase axis of a cellulose acylate film formed of a cellulose ester-based resin film becomes oriented in the transverse direction.

On the other hand, the transmission axis of a polarizer is also usually oriented in the transverse direction.

When a polarizing plate in which lamination has been carried out so that the transmission axis of a polarizer and the delayed phase axis of a cellulose acylate film are in parallel is incorporated in a liquid crystal display device, display contrast of the liquid crystal display device can be enhanced and also excellent viewing angle can be ensured.

The glass transition temperature Tg of a film constituting material can be controlled by changing material types constituting the film and ratios of constituting materials.

When a retardation film is produced as an optical film, Tg is commonly at least 120° C., preferably at least 135° C.

In a liquid crystal display device, in the display state of an image, due to an increase in the temperature of the device itself for example, temperature increase resulting from a light source, the temperature ambience of the film changes. In this case, when the Tg of the film is smaller than the use ambient temperature of the film, retardation value resulting from the orientation state of molecules fixed in the interior of the film via stretching and dimension as the film change to a large extent. When the Tg of the film is excessively large, during film formation of a film constituting material, temperature excessively increases, and thereby, the consumption of energy for heating increases and also decomposition of the material itself during film formation and coloring caused thereby may occur. Therefore, Tg is preferably at most 250° C.

When a retardation film is produced as an optical film and further the function of a polarizing plate protective film is combined, refraction index needs to be controlled. This refractive index controlling can be carried out by a stretching operation. And, such a stretching operation is a preferable method.

The stretching method will now be described.

In the stretching step of a retardation film, sketching is carried out by a factor of 1.0-2.0 in one direction of a cellulose resin and by a factor of 1.01-2.5 in the direction vertical thereto in the film in-plane direction, whereby retardations Ro and Rt to be required can be controlled.

Herein, "Ro" represents in-plane retardation and a value obtained by multiplying the difference between the refractive index of the in-plane longitudinal direction MD and the refractive index of the transverse direction TD by thickness. "Rt" represents retardation in the thickness direction and a value obtained by multiplying the difference between the in-plane refractive index (the average value of the refractive index of the longitudinal direction MD and the refractive index of the transverse direction TD) by thickness.

Stretching can be carried out sequentially or simultaneously, for example, in the longitudinal direction of the film and in the direction at right angles thereto in the film in-plane direction, e.g., the transverse direction. In this case, when stretching factor at least with respect to one direction is excessively small, inadequate retardation is realized. In the case of being excessively large, stretching becomes difficult to carry out and thereby film breakage may occur.

Stretching in biaxial directions at right angles to each other is an effective method to allow the refractive indexes nx, ny, and nz of the film to fall within predetermined ranges.

Herein, "nx" represents the refractive index of the longitudinal direction MD, "ny" represents the refractive index of the transverse direction TD, and "nz" represents the refractive index of the thickness direction.

For example, in cases in which stretching is carried out in the melt casting direction, when contraction in the transverse direction is excessively large, the value of nz becomes excessively large. In this case, an improvement can be made via controlling of transverse contraction of the film or stretching also in the transverse direction. When stretching is carried out in the transverse direction, refractive index may be distributed in the transverse direction. This distribution sometimes appears when a tenter method is employed, being a phenomenon generated due to contraction force generation in the film center portion resulting from stretching of the film in the transverse direction and fixing of edges of the film. This phenomenon is considered a so-called bowing phenomenon. Also, in this case, when stretching is carried out in the casting direction, such a bowing phenomenon can be inhibited and then the retardation distribution of the transverse direction can be minimized.

Stretching in biaxial directions at right angles to each other can decrease the film thickness variation of an obtained film. When the film thickness variation of a retardation film is excessively large, retardation nonuniformity occurs and then in use for a liquid crystal display, nonuniformity such coloring may become problematic.

The film thickness variation of a cellulose ester film is preferably in the range of ±3%, more preferably ±1%. For this target, a method to carry out stretching in biaxial directions at right angles to each other is effective. The stretching factors of the biaxial directions at right angles to each other are finally preferably in the ranges of a factor of 1.0-2.0 and a factor of 1.01-2.5 in the casting direction and the transverse direction, and more preferably in the ranges of 1.01-1.5 and a factor of 1.05-2.0 in the casting direction and the transverse direction, respectively, to obtain a required retardation value.

When the absorption axis of a polarizer is present in the longitudinal direction, the transmission axis of the polarizer is in accord with the transverse direction. To obtain a long-length polarizing plate, a retardation film is preferably stretched so that the delayed phase axis corresponds to the transverse direction.

When a cellulose ester resin realizing positive birefringence with respect to stress is used, from the above constitution, stretching in the transverse direction can provide the delayed phase axis of a retardation film in the transverse direction.

In this case, to enhance display quality, the delayed phase axis of the retardation film is preferably present in the transverse direction. To realize the target retardation value, the condition of the expression of (transverse direction stretching factor)>(casting direction stretching factor) needs to be satisfied.

(7) Post-Processing Step

In the post-processing step, edges of a stretched film precursor 10 are slit to a product width to be cut off using the slitter 13, and then both film edges are knurled (embossed) using the knurling apparatus constituted of an embossing ring 14 and a back roll 15.

Such processing can prevent occurrence of adhesion and scratches within a cellulose acylate film (master roll).

In the knurling method, processing can be carried out by heating and pressing a metal ring having an uneven pattern on the sides.

Herein, clip holding portions of both film edges are usually deformed, being unusable as a film product, and then these portions are removed and reused as a raw material.

By the above processing, protective films 114, 116, 124, and 126 are produced.

[Protective Film Production Method (Solution Casting Method)]

The solution casting method refers to a film forming method in which a solution in which a cellulose ester (additives may be contained) is dissolved in a solvent is cast to form a film and then from the film, the solvent is evaporated to dryness to produce a protective film. As the solution casting method, any appropriate well-known method is employable.

As the solution casting method, the methods described, for example, in U.S. Pat. Nos. 2,492,978, 2,739,070, 2,739,069, 2,492,977, 2,336,310, 2,367,603, and 2,607,704; British Patent Nos. 64,071 and 735,892; and Examined Japanese Patent Application Publication Nos. 45-9074, 49-4554, 49-5614, 60-27562, 61-39890, and 62-4208 can be referred to.

The solution casting method is roughly divided into
a step to prepare a dope by dissolving a cellulose ester and additives in a solvent,
a step to cast the dope on an endless metal support moving infinitely,
a step to dry the cast dope as a web,
a step to carry out peeling from the metal support,
a step to carry out stretching or transverse holding, and
a step to dry.

The step to prepare a dope will now be described.

The concentration of a cellulose ester in a dope is preferably large, since the drying load after casting on the metal support can be reduced. However, when the concentration of the cellulose ester is excessively large, the load during filtration increases, and thereby filtration accuracy decreases. The concentration to achieve a good balance therebetween is preferably 10-35% by mass, more preferably 15-25% by mass.

A single solvent or at least 2 types of solvent combined may be used for a dope. However, a good solvent and a poor solvent of a cellulose ester are preferably mixed and used in view of production efficiency. A larger amount of the good solvent is preferable in view of the solubility of the cellulose ester.

With respect to a preferable range of the mixing ratio of a good solvent and a poor solvent, the good solvent is at 70-98% by mass and the poor solvent is at 2-30% by mass.

With regard to the good solvent and the poor solvent, the good solvent is defined as a solvent singly dissolving a cellulose ester used and the poor solvent is defined as a solvent which singly swells or does not dissolve the cellulose ester. Thereby, a good solvent and a poor solvent may be changed, depending on the average degree of acetylation (the substitution degree of an acetyl group) of a cellulose ester. For example, when acetone is used as a solvent, it functions as a good solvent for an acetic acid ester of a cellulose ester (the substitution degree of an acetyl group: 2.4) and cellulose propionate and functions as a poor solvent for acetic acid ester of cellulose (the substitution degree of an acetyl group: 2.8).

The good solvent used in the present invention is not specifically limited, including organic halogen compounds such as methylene chloride, dioxolanes, acetone, methyl acetate, and methyl acetoacetate. Methylene chloride and methyl acetate are specifically preferably used. Further, the poor solvent used in the present invention is not specifically limited. For example, methanol, ethanol, n-butanol, cyclohexane, and cyclohexanone are preferably used. And, in a dope, water is preferably contained at 0.01-2% by mass.

Further, for a solvent used to dissolve a cellulose ester, a solvent having been removed from a film by drying in the film forming step is recovered and reused. In a recovered solvent, a minimal amount of additives added to a cellulose ester, for example, a plasticizer, a UV absorbent, a polymer, and a monomer component may be contained. However, even if these are contained, reuse is preferably performed. Reuse after purification can be performed if appropriate.

As the dissolving method of a cellulose ester in preparation of a dope as described above, any appropriate common method is usable. Combination of heating and pressurization can realize heating up to at least boiling point at normal pressure. When stirring-dissolution is carried out with heating at the boiling point or more of a solvent at normal pressure and at the temperature range in which the solvent does not boil under pressure, occurrence of massive undissolved materials referred to as gel or aggregated substances is prevented, which is preferable.

Further, a method, in which a cellulose ester is wetted or swollen by mixing with a poor solvent, followed by being dissolved by adding a good solvent, may preferably be used. With regard to pressurization, a method to inject an inert gas such nitrogen gas or a method to increase the vapor pressure of a solvent by heating is also employable.

Heating is preferably carried out from the outside. For example, a jacket type is preferable due to easy temperature control. Heating temperature in the case of solvent addition is preferably high from the viewpoint of the solubility of a cellulose ester. However, when the heating temperature is excessively high, required pressure is excessively large, resulting in decreased productivity. The heating temperature is preferably 45-120° C., more preferably 60-110° C., still more preferably 70-105° C.

Further, pressure is adjusted so as for a solvent not to boil at a set temperature. Alternatively, a cooling dissolution method is also preferably used. Using this method, a cellulose ester can be dissolved in a solvent such as methyl acetate.

Next, this cellulose ester solution is filtered using an appropriate filter medium such as filter paper. The filter medium preferably has small absolute filtration rating to remove undissolved materials. However, when the absolute filtration rating is excessively small, the problem that clogging of the filter medium tends to occur is produced.

Therefore, the filter medium has an absolute filtration rating of at most 0.008 mm, more preferably 0.001-0.008 mm, still more preferably 0.003-0.006 mm.

The material of the filter medium is not specifically limited and a common filter medium is usable. A filter medium made of a plastic such as polypropylene or TEFLON (a registered trademark) or a filter medium made of a metal such as stainless steel is preferable due to no fiber dropping. Via filtration, impurities, specifically luminescent spot foreign materials contained in a cellulose ester as a raw material are preferably eliminated or reduced.

In the case where 2 polarizing plates are arranged in the cross-nicol state and therebetween, an optical film is placed and then light is irradiated from one polarizing plate side and observation is carried out from the other polarizing plate side, the luminescent spot foreign materials refer to spots (foreign materials) viewed due to light leakage from the opposite side. The number of luminescent spots having a diameter of at least 100 mm is preferably at most 200/cm$^2$, more preferably at most 100/cm$^2$, still more preferably at most 50/cm$^2$, yet more preferably 0-10/cm$^2$. Further, the smaller number of luminescent spots of at most 0.01 mm is preferable.

A dope can be filtered using a common method. Preferable is a method in which filtration is carried out at the boiling point or more of a solvent at normal pressure and in the temperature range in which the solvent does not boil under pressure since an increase in the difference of filtration pressure before and after filtration (referred to as differential pressure) is small. Preferable temperature is 45-120° C., more preferably 45-70° C., still more preferably 45-55° C. Smaller filtration pressure is preferable. The filtration pressure is preferably at most 1.6 MPa, more preferably at most 1.2 MPa, still more preferably at most 1.0 MPa.

Dope casting will now be described.

The metal support in the casting step is preferably one whose surface is mirror-finished. As the metal support, a stainless steel belt or a drum made of a cast metal whose surface is plated is preferably used. The width of casting can range from 1-4 m. In the casting step, the surface temperature of the metal support is in the range of −50° C.—less than the boiling point of a solvent and higher temperature is preferable since the drying rate of a web can increase. However, excessively high temperature may cause foaming in the web and degradation of flatness. The support temperature is preferably 0-55° C., more preferably 25-50° C. Alternatively, a method in which a web is gelated by cooling and then peeled from a drum in the state of containing a large amount of a residual solvent is preferable. The method to control the temperature of the metal support is not specifically limited, including a method to blow warm air or cool air and a method to allow warm water to make contact with the rear side of the metal support. Warm water is preferably used due to efficient heat transfer, which shortens the time elapsing until the temperature of the metal support becomes constant. In use of warm air, wind having a higher temperature than the target temperature may be employed.

To allow a cellulose ester film to exhibit excellent flatness, the residual solvent amount during peeling of a web from the metal support is preferably 10-150% by mass, more preferably 20-40% by mass or 60-130% by mass, specifically preferably 20-30% by mass or 70-120% by mass.

In the present invention, the residual solvent amount is defined by the following expression.

$$\text{Residual solvent amount (\% by mass)} = \{(M-N)/N\} \times 100$$

Herein, M represents the mass of a sample collected at any appropriate timing during or after production of a web or film and N represents the mass after one-hour heating of M at 115° C.

Further, in the drying step of a cellulose ester film, it is preferable that a web is peeled from the metal support, followed by drying to control the residual solvent amount at 0.01% by mass or less.

In the film drying step, a method to dry a web while conveyed commonly using a roll drying method (a drying method in which a web is alternately passed through a large number of rolls arranged vertically) or a tenter method is employed.

To produce the cellulose ester film of the present invention, using a tenter method in which both edges of a web are held by clips, stretching is specifically preferably carried out in the transverse direction (the horizontal direction). Stretching is preferably performed at a stretching tension of at most 300 N/m.

The method to dry the web is not specifically limited, and drying can be carried out commonly using hot air, infrared radiation, a heating roll, or microwaves. Hot air is preferably used due to ease and convenience. The drying temperature in the web drying step is raised in a stepwise manner preferably up to the range of 40-200° C.

For the cellulose ester film of the present invention, those having a width of 1-4 m are used. Especially, those having a width of 1.4-4 m are preferably used and those having a width of 1.6-3 in are specifically preferably used. A web of more than 4 m causes the difficulty of conveyance.

Clip holding portions of both film edges cut in the film forming step are pulverized and then may be reused as a film raw material of the same type or a different type.

Via the above processing, protective films 114, 116, 124, and 126 are produced.

[Hard Coat Film Production Method]

In the present invention, as a method to adjust the mixed region, humidification of a protective film prior to coating of a hard coat layer is cited. The moisture content of the protective film needs to become 1.5-4% by this humidifying step.

When a protective film 114 is produced by the above melt casting method, (A1) the protective film 114 is humidified to allow the moisture content thereof to be 1.5-4%, preferably 1.5-2.5%.

In this case, since the protective film 114 has been produced by the melt casting method, no solvent basically remains in the protective film 114.

(A2) Thereafter, the protective film 114 is coated with a certain coating liquid, followed by drying to form a hard coat layer 118 on the protective film 114.

On the other hand, when a protective film 114 is produced by the above solution casting method, (B1) the protective film 114 is heated (dried) to allow the residual amount of a solvent remaining in the protective film 114 to be at most 0.01%.

In this case, in the production process of the protective film 114 using the solution casting method, when the residual solvent amount of the protective film 114 is at most 0.01%, the above heating is not specifically required.

(B2) Thereafter, the same processings as above (A1) and (A2) need only to be carried out.

The residual solvent amount in the drying step of (B1) is defined by the following expression.

$$\text{Residual solvent amount (\% by mass)} = \{(M-N)/N\} \times 100$$

In the expression, "M" represents the mass of a protective film 114 after production and "N" represents the mass after one-hour heating of M at 115° C.

Herein, in the above description, a hard coat layer 118 has been formed with no winding of a protective film 114. However, it is possible that a protective film 114 is wound prior to the humidifying step of (A1) and thereafter the processing of the humidifying step of (A1) may be carried out, or after the humidifying step of (A1), the protective film 114 is wound and thereafter the processing of the hard coat layer forming step of (A2) may be carried out.

[Polarizing Plate Production Method]

A polyvinyl alcohol aqueous solution is subjected to film formation, and then the resulting film is uniaxially stretched and then dyed, or is dyed and then uniaxially stretched. Thereafter, durability treatment is preferably carried out using a boron compound to produce polarizers 112 and 122.

Then, the protective films 114 and 116 are alkali-saponified and the thus-treated films are bonded to the polarizer 112 using a completely saponified polyvinyl alcohol aqueous solution (a water-based adhesive containing, as a main component, completely saponified polyvinyl alcohol) to produce a polarizing plate 110.

In the same manner as above, the protective films 124 and 126 are alkali-saponified and the thus-treated films are bonded to the polarizer 122 using a completely saponified polyvinyl alcohol aqueous solution (a water-based adhesive containing, as a main component, completely saponified polyvinyl alcohol) to produce a polarizing plate 120.

[Liquid Crystal Panel Production Method]

An adhesive layer is formed each on the polarizing plates 110 and 120 and then the polarizing plate 110 and 120 are formed into a roll. As the rolls each are sequentially unwound, the polarizing plates 110 and 120 are divided into the size of a panel.

On the other hand, separately from the polarizing plates 110 and 120, a liquid crystal cell 102 is also cut into the size of the panel.

Thereafter, the polarizing plates 110 and 120 of the panel size each are positioned and bonded to the liquid crystal cell 102 of the panel size to produce a liquid crystal panel 100.

Instead of this production method, it is possible that an adhesive layer is formed on the polarizing plates 110 and 120 and then the polarizing plates 110 and 120 are formed into a roll; as the rolls are sequentially unwound, the polarizing plates 110 and 120 each are bonded to the liquid crystal cell 102; and then the polarizing plates 110 and 120 and the liquid crystal cell 102 are simultaneously cut into the panel size.

According to the above embodiments, when a hard coat film 130 is produced, the thicknesses of a protective film 114 and a hard coat layer 118 and the moisture content and the residual solvent amount (in the case of the solution casting method) of the protective film 114 are adjusted to optimize (control) the sum of the thicknesses of the protective film 114 and the hard coat layer 118 and the mixed region of the protective film 114 and the hard coat layer 118 at certain ranges.

Thereby, saponification nonuniformity and blocking occurrence can be prevented or inhibited, and also the cutting performance of polarizing plates 110 and 120 during liquid crystal panel production and the dimensional stability of the polarizing plates 110 and 120 affected by a residual solvent in use of the solution casting method can be enhanced (refer to following EXAMPLES).

EXAMPLES

The present invention will be specifically described with reference to examples that by no means limit the scope of the present invention.

(1) Sample Production

For production of each sample, the following materials were selected as a cellulose ester and additives.

[Cellulose Ester]

Cellulose acetate propionate (acetyl group substitution degree: 1.63, propionyl group substitution degree: 1.21, total acyl group substitution degree: 2.84, and number average molecular weight: 90000)

Herein, the determination method of the substitution degree of an acyl group such as an acetyl group, a propionyl group, and a butyryl group was performed based on the standard of ASTM-D817-96.

[Additives]

| | |
|---|---|
| VB7102 (a copolymer of methyl methacrylate/methyl acrylate/2-hydroxyethyl methacrylate = 7/2/1 (parts by mass each), molecular weight: 6300, produced by Mitsubishi Rayon Co., Ltd.) | the amounts described in Table 1 |
| UMM1001 (produced by Soken Chemicals & Engineering Co., Ltd.) | the amounts described in Table 1 |
| PETB (pentaerythritol tetrabenzoate, produced by Sigma-Aldrich Corp.) | the amounts described in Table 1 |
| SUMILIZER GP (produced by Sumitomo Kagaku Co., Ltd.) | 0.06 parts by mass |
| IRGANOX1010 (produced by Ciba Japan K.K.) | 0.5 parts by mass |
| SUMILIZER GS (produced by Sumitomo Kagaku Co., Ltd.) | 0.5 parts by mass |
| UV absorbent Ti928 (produced by Ciba Japan K.K.) | 1.5 parts by mass |
| Matting agent SEAHOSTAR KEP-30 (produced by Nippon Shokubai Co., Ltd.) | 0.1 parts by mass |

(1.1) Production of Sample 1

(1.1.1) Hard Coat Film Production

The above cellulose ester was dried at 70° C. for 3 hours under pressure, followed by being cooled down to room temperature, and the above additives, UV absorbent, and matting agent (herein, the added amount of the cellulose ester is an amount to account for 100 parts by mass after addition of every additive described above) were mixed.

This mixture was mixed using a vacuum Nauta mixer at 80° C. and 1333 Pa for 3 hours to be further dried.

The thus-obtained mixture was melt-kneaded using a biaxial extruder at 235° C. to be pelletized. In this case, to control heat production via shearing during kneading, an oar screw-type screw was used instead of a kneading disc. Further, from a vent hole, vacuum drawing was carried out to suction and eliminate volatile components generated during kneading.

Incidentally, the feeder and the hopper for feeding to the extruder and the part between the extruder die and the cooling tank was allowed to be under dry nitrogen gas ambience to prevent the resin from absorbing moisture.

The first cooling roll and the second cooling roll were made of stainless steel of a diameter of 40 cm and each surface thereof was subjected to hard chromium plating. Further, in the interior thereof, a temperature adjusting oil (a cooling fluid) was circulated to control the roll surface temperature. The elastic touch roll was allowed to have a diameter of 20 cm and the inner cylinder and the outer cylinder were made of stainless steel. The surface of the outer cylinder was subjected to hard chromium plating. The wall thickness of the outer cylinder was 2 mm. In the space between the inner cylinder and the outer cylinder, a temperature adjusting oil (a cooling fluid) was circulated to control the surface temperature of the elastic touch roll.

The thus-obtained pellet was extruded into a film from a T die using a uniaxial extruder at a melt temperature of 250° C., followed by being cast onto the first cooling roll of a surface temperature of 100° C. to obtain a film of a draw ratio of 20 and a film thickness of 80 µm. In this case, a T die having a T die lip clearance of 1.5 mm and a lip portion average surface roughness Ra of 0.01 µm was used. Further, from the hopper opening of the extruder intermediate portion, silica fine particles serving as a lubricant was added so as to account for 0.1 parts by mass.

Then, on the first cooling roll, the film was pressed using an elastic touch roll having a metal surface of a thickness of 2 mm at a linear pressure of 10 kg/cm. The film temperature on the touch roll side during pressurization was 180±1° C. (the film temperature on the touch roll side during pressurization referred to herein refers to the average value of film surface temperatures in which the temperature of the film of the position with which the touch roll on the first roll (a cooling roll) made contact was measured using a non-contact thermometer at 10 locations in the transverse direction at a distance of 50 cm in the state without the touch roll created by withdrawing the touch roll). The glass transition temperature Tg of this film was 136° C. (by a DSC method (under nitrogen, temperature raising rate: 10° C./minute) employing DSC6200 produced by Seiko Instruments Inc., the glass transition temperature of the film having been extruded from the die was measured).

Herein, the surface temperatures of the elastic touch roll and the second cooling roll were allowed to be 100° C. and 30° C., respectively. The surface temperature of each of the elastic touch roll, the first cooling roll, and the second cooling roll was designated as an average value in which using a non-contact thermometer, the temperature of the roll surface at the position of 90°, in the rotational direction, prior to the position where the film initially made contact with the roll was measured at 10 locations in the transverse direction.

The thus-obtained film was introduced into a tenter having a preheating zone, a stretching zone, a holding zone, and a cooling zone (between the zones, a neutral zone to ensure heat insulation between the zones was also provided), stretched by a factor of 1.9 in the transverse direction at 160° C., and cooled down to 70° C. while being relaxed by 2% in the transverse direction. Thereafter, releasing from the clips was carried out and the clip holding portions were cut off, followed by knurling of a width of 10 mm and a height of 5 µm for both film edges to obtain a cellulose ester film of 30 μm having been slit to a width of 1430 mm. In this case, the preheating temperature and the holding temperature were adjusted to prevent a bowing phenomenon due to stretching. In the thus-obtained cellulose ester film, no residual solvent was detected.

This cellulose ester film was humidified using each of the methods described in Table 1 and then coated with hard coat layer composition 1 described below for formation of a hard coat layer on the protective film to produce a hard coat film.

[Hard Coat Layer Composition 1]

Solvent changed product of Z7537 (i-propyl alcohol/methyl ethyl ketone=9/1 (mass ratio), coating liquid solid concentration: 50% by mass, produced by ISR Corp.)

The film thickness of each hard coat layer is described in Table 1. Herein, the film thickness of the hard coat layer was represented as a calculated value calculated from the coating amount and the coating liquid solid concentration without consideration of the mixed region.

(1.1.2) Polarizer Production

A polyvinyl alcohol film of a thickness of 120 μm was uniaxially stretched (temperature: 110° C., stretching factor: 5).

The thus-stretched film was immersed in an aqueous solution containing 0.075 g of iodine, 5 g of potassium iodide, and 100 g of water for 60 seconds, and then immersed in an aqueous solution of 68° C. containing 6 g of potassium iodide, 7.5 g of boric acid, and 100 g of water.

The thus-treated film was washed and dried to obtain a polarizer.

(1.13) Polarizing Plate Production

Based on following steps 1-5, a polarizing plate was produced using the above hard coat film, the cellulose ester film (a protective film for the rear side) in which no hard coat layer was coated, and the polarizer.

Step 1: Protective films of both sides were immersed in a sodium hydroxide solution of 2 mol/l at 50° C. for 90 seconds, followed by washing and drying to be saponified.

Step 2: The polarizer was immersed in a polyvinyl alcohol aqueous solution of a solid content of 2% by mass for 1-2 seconds.

Step 3: An excessive amount of the adhesive having adhered to the polarizer in step 2 was lightly wiped off and then the protective films having been treated in step 1 were placed on both sides of the polarizer for lamination.

Step 4: The laminated product having been produced in step 3 was bonded at a pressure of 20-30 N/cm$^2$ and a conveyance rate of about 2 m/minute.

Step 5: The bonded product having been produced in step 4 was dried in a drier of 80° C. for 2 minutes and wound into a roll to give a polarizing plate roll.

The polarizing plate having been obtained via the above processing was designated as "sample 1."

(1.2) Production of Samples 2-4 and 6-9

"Samples 2-4 and 6-9" were produced in the same manner as in production of sample 1 except that therein, the added amounts of additives (VB7102, UMM1001, and PETB), the film thicknesses of the protective films and the hard coat layer, the humidifying method were changed as described in Table 1.

Herein, as hard coat layer composition 2, the following materials were used

[Hard Coat Layer Composition 2]

Solvent changed product of 500-28 (i-propyl alcohol/methyl ethyl ketone=9/1 (mass ratio), solid concentration: 40% by mass, produced by Adeka Corp.)

(1.3) Production of Sample 5

"Sample 5" was produced in the same manner as in production of sample 1 except that therein, the production method of the protective film was changed as described below.

Initially, the following composition was placed into a sealed container, followed by keeping the temperature at 80° C. under pressure and complete dissolution with stirring to produce a dope composition.

[Dope Composition]

| | |
|---|---|
| Cellulose triacetate | 100 parts by mass |
| (average acetylation degree: 61.0%) | |
| Triphenyl phosphate | 8 parts by mass |
| Ethylphthalyl ethyl glycol | 2 parts by mass |
| TINUVIN 109 (produced by Ciba Japan K.K.) | 1 part by mass |
| TINUVIN 171 (produced by Ciba Japan K.K.) | 1 part by mass |
| Methylene chloride | 430 parts by mass |
| Methanol | 90 parts by mass |

Subsequently, this cope composition was filtered and cooled, followed by being uniformly cast onto a stainless steel band while kept at 33° C.; peeled from the stainless steel band when the solvents was evaporated until peeling could be carried out; stretched by a factor of 1.1 in the transverse direction using a tenter, and dried while conveyed using a large number of rolls until the residual solvent amount reached the amount described in Table 1. The resulting film was passed through a humidity conditioning zone of 80% RH and then knurled for both edges thereof of a height of 10 μm to be wound.

On this cellulose ester film, following hard coat layer composition 3 was coated and thereby a hard coat layer was formed to produce a hard coat film.

[Hard Coat Layer Composition 3]

500-28 (solid concentration: 40% by mass, produced by Adeka Corp.)

(1.4) Production of Samples 10-12

"Samples 10-12" were produced in the same manner as in production of sample 5 except that therein, production conditions of the protective film and the hard coat layer were changed as described in Table 1.

TABLE 1

| | | Protective Film | | | | | | | Hard Coat Layer | |
|---|---|---|---|---|---|---|---|---|---|---|
| | | Added Amount (parts by mass) | | | | | | | | |
| Sample | Production Method | VB 7102 | UMM 1001 | PET B | Humidifying Method | Thickness (μm) | Moisture Content (%) | Residual Solvent (%) | Composition No. | Thickness (μm) |
| 1 | Melt Casting | — | — | 8 | A | 30 | 3.8 | 0 | 1 | 5 |
| 2 | | 10 | — | 4 | B | 30 | 2.3 | | 2 | 5 |
| 3 | | 10 | 2 | 4 | | 25 | 1.5 | | | 4.5 |
| 4 | | 6 | 2 | 4 | C | 20 | 3.2 | | | 5 |

TABLE 1-continued

| | | Protective Film | | | | | | | Hard Coat Layer | |
|---|---|---|---|---|---|---|---|---|---|---|
| | | Added Amount (parts by mass) | | | | | | | | |
| Sample | Production Method | VB 7102 | UMM 1001 | PET B | Humidifying Method | Thickness (μm) | Moisture Content (%) | Residual Solvent (%) | Composition No. | Thickness (μm) |
| 5 | Solution Casting | | — | | A | 30 | 3.6 | 0.01 | 3 | 5 |
| 6 | Melt Casting | 10 | — | 4 | — | 40 | 1.6 | 0 | 2 | 10 |
| 7 | | 10 | 2 | 4 | | 30 | 1.0 | | 1 | 5 |
| 8 | | 6 | 2 | 4 | B | 40 | 3.7 | | | 10 |
| 9 | | 6 | 2 | 4 | | 30 | 5.1 | | 2 | 5 |
| 10 | Solution Casting | | — | | A | 30 | 3.8 | 0.08 | 3 | 10 |
| 11 | | | | | | 41 | 3.9 | 0.1 | | 10 |
| 12 | | | | | | 41 | 3.9 | 0.1 | | 5 |

In Table 1, the humidifying methods A-C are described below.

Humidifying Method A

Passing through a humidifying zone of 80% RH and then winding are performed and thereafter a hard coat layer is formed (humidification→winding→hard coat layer formation)

Humidifying Method B

A protective film is temporarily wound, and while being unwound, this protective film is humidified with water vapor to form a hard coat layer (winding→humidification→hard coat layer formation).

Humidifying Method C

Passing through a humidifying zone of 80% RH is performed and then a hard coat layer is formed as-humidified (humidification→hard coat layer formation).

(2) Evaluation of Polarizing Plates

The produced polarizing plates were evaluated by the following method. The evaluation results are shown in Table 2.

(2.1) Measurement of the Mixed Region of a Protective Film and a Hard Coat Layer Part of a polarizing plate was covered with an epoxy resin and then the cross-section was shaved off using a microtome to take an SEM image (×3,000). Each layer of this SEM image (monochrome) was subjected to colorimetric measurement using spectrophotometer CM-2500d (produced by Konica Minolta Sensing, Inc.). Then, parts having a difference in L* of at least 2.00 were designated as the interface between the hard coat layer and the mixed region and the interface between the mixed region and the protective film, and based on the following expression, the mixed region (%) of the protective film and the hard coat layer was calculated.

Mixed region (%)=mixed region thickness (μm)/{hard coat layer thickness except for the mixed region (μm)+mixed region thickness (μm)+protective film thickness (μm)}×100

(2.2) Saponification Nonuniformity

Fluorescent light was reflected on each polarizing plate to conduct visual evaluation based on the following criteria A: Any streak-like defect and spot-like defect and nonuniformity are noted.

B: A streak-like defect, a spot-like defect, and nonuniformity are partially noted.

C: A streak-like defect, a spot-like defect, and nonuniformity are entirely noted.

(2.3) Blocking in the Roll State

On the day after production of a polarizing plate roll, the entire amount thereof was wound off and then at the position within 100 m from the winding core side, visual confirmation whether or not blocking occurred at the interface of the protective film and the hard coat layer was made.

(2.4) Cutting Performance

A required amount was wound off a polarizing plate roll and was bonded to a liquid crystal cell via an adhesive layer. Thereafter, the magnitude of material breakage and peeling properties on cutting-out was visually observed, and then cutting performance was evaluated based on the following criteria.

A: Cutting can be cleanly carried out

B: Material (base material) breakage partially occurs but an area peeling at the interface of a protective film and a hard coat layer exists.

C: Peeling occurs at the interface of a protective film and a hard coat layer.

(2.5) Dimensional Stability

An arrangement is made in advance in which on the surface of the hard coat layer side of each polarizing plate, cross-shaped lines are drawn with a razor blade in 10-cm intervals in the MD (longitudinal direction) and the TD (transverse direction) and then accurate distance are measured using an optical microscope. This sample was stored at 80° C. and 90% RH for 50 hours and thereafter the distance was measured again to examine the difference before and after storage (dimension change rate (%)).

TABLE 2

| | | | Polarizing Plate | | | | | |
|---|---|---|---|---|---|---|---|---|
| | Thickness Sum | Mixed Region | Saponification | Roll | Cutting | Dimension Change Rate (%) | | |
| Sample | (μm) | (%) | Nonuniformity | Blocking | Performance | MD | TD | Remarks |
| 1 | 35 | 15 | A | absent | A | −0.4 | 0.4 | Examples |
| 2 | 35 | 11 | A | | A | −0.6 | 0.5 | |

TABLE 2-continued

| | | | Polarizing Plate | | | | | |
|---|---|---|---|---|---|---|---|---|
| | Thickness Sum | Mixed Region | Saponification | Roll | Cutting | Dimension Change Rate (%) | | |
| Sample | (μm) | (%) | Nonuniformity | Blocking | Performance | MD | TD | Remarks |
| 3 | 29.5 | 13 | A | | A | −0.4 | 0.3 | |
| 4 | 25 | 18 | A | | A | −0.3 | 0.3 | |
| 5 | 35 | 12 | A | | A | −0.6 | 0.5 | |
| 6 | 50 | 25 | C | | C | −0.4 | 0.3 | Comparative |
| 7 | 35 | 32 | C | | B | −0.5 | 0.5 | Examples |
| 8 | 50 | 17 | A | | C | −0.3 | 0.4 | |
| 9 | 40 | 10 | A | present | B | −0.8 | −0.8 | |
| 10 | 40 | 22 | B | absent | C | −0.7 | 0.7 | |
| 11 | 51 | 14 | A | | C | −0.8 | 0.7 | |
| 12 | 51 | 12 | A | | C | −0.9 | 0.8 | |

(3) Summary

As shown in Table 2, when samples 1-5 and samples 6-12 are compared with each other, in samples 1-5, saponification nonuniformity and roll blocking are inhibited, and excellent cutting performance and dimensional stability are expressed.

The above results show that a technique, in which the sum of the thickness of a protective film and the thickness of a hard coat layer is allowed to be less than 40 μm and also the mixed region of the protective film and the hard coat layer is allowed to be 1-20%, is useful for preventing or inhibiting saponification nonuniformity and roll blocking and for enhancing cutting performance and dimensional stability; and to realize such a constitution, a technique in which the residual solvent amount and the moisture content of the protective film are allowed to be at most 0.01% and 1.5-4%, respectively, is useful in the production process.

Description of the Symbols

1: extruder
2: metal nonwoven filter
210: filtering layer present on the most downstream side
220 and 230: filtering layers present on the upstream side
240: protective mesh
250: inflow opening
260: outflow opening
270: housing
3: static mixer
4: casting die
5: first cooling roll
6: touch roll
7: second cooling roll
8: third cooling roll
9, 11, 13, 14, and 15: conveyance rolls
10: film precursor
31: die main body
32: slit
41: metal sleeve
42: elastic roller
43: metal inner cylinder
44: rubber
45: cooling water
100: liquid crystal panel
102: liquid crystal cell
110 and 120: polarizing plates
112 and 122: polarizers
114, 116, 124, and 126: protective films
118: hard coat layer
119: mixed region
130: hard coat film
A: the interface of a hard coat layer and a mixed region
B: the interface of a mixed region and a protective film

The invention claimed is:

1. A method for producing a hard coat film in which a hard coat layer is formed on a protective film to protect a polarizer, and a sum of the thickness of the protective film and the thickness of the hard coat layer is less than 40 μm, comprising the steps of sequentially:

producing the protective film using a solution casting method, humidifying the protective film, and forming the hard coat layer by coating a hard coat coating liquid on the protective film, wherein a moisture content of the protective film is 1.5 to 4% in the step of humidifying the protective film, and wherein a mixed region of the protective film and the hard coat layer is formed at the forming step, and a ratio of the mixed region calculated by the following formula is 11 to 18%:

the ratio of mixed region (%)=[the thickness of the mixed region (μm)/{the thickness of the hard coat layer except for the mixed region (μm)+the thickness of the mixed region (μm)+the thickness of the protective film (μm)}]×100.

2. The method for producing a hard coat film of claim 1, wherein the moisture content of the protective film is 1.5-2.5% in the step to humidify the protective film.

3. The method for producing a hard coat film of claim 1, which further comprises a step in which the protective film is wound after the step to humidify the protective film.

4. The method for producing a hard coat film of claim 1, wherein the protective film is composed of a cellulose ester resin, which satisfies all the conditions of expression (1)-expression (3), $$2.0 \leq X+Y \leq 3.0 \tag{1}$$

$$0.1 \leq X \leq 2.9 \tag{2}$$

$$0.1 \leq Y \leq 2.9 \tag{3}$$

wherein X is a substitution degree of an acetyl group and Y is a sum of a substitution degree of a propionyl group and a substitution degree of a butyryl group.

5. The method for producing a hard coat film of claim 4, which satisfies all the conditions of expression (4)-expression (6), $$2.5 \leq X+Y \leq 3.0 \tag{4}$$

$$0.1 \leq X \leq 1.5 \tag{5}$$

$$1.5 \leq Y \leq 2.9 \tag{6}$$

6. The method for producing a hard coat film of claim 1, wherein the thickness of a mixed region of the protective film and the hard coat layer is 1-20% of that of the hard coat layer.

7. A method for producing a liquid crystal panel which comprises:
   a step to produce a hard coat film by a method of claim 1,
   a step to produce a polarizing plate by bonding the hard coat film and a protective film each to a polarizer,
   a step to separately cut the polarizing plate and a liquid crystal cell to the size of a panel, and
   a step to bond the cut polarizing plate to the cut liquid crystal cell.

8. A method for producing a liquid crystal panel which comprises:
   a step to produce a hard coat film by a method of claim 1,
   a step to produce a polarizing plate by bonding the hard coat film and a protective film each to a polarizer, and
   a step to simultaneously cut the polarizing plate and the liquid crystal cell to the size of a panel.

* * * * *